(12) United States Patent
Lee et al.

(10) Patent No.: US 10,686,338 B2
(45) Date of Patent: Jun. 16, 2020

(54) ELECTRONIC DEVICE AND FOREIGN OBJECT DETECTION METHOD FOR ELECTRONIC DEVICE

(71) Applicant: Samsung Electronics Co., Ltd., Gyeonggi-do (KR)

(72) Inventors: Jong-Won Lee, Gyeonggi-do (KR); Na-Hyang Kim, Gyeonggi-do (KR); Yong-Youn Kim, Gyeonggi-do (KR); Soon Park, Gyeonggi-do (KR); Eun-Hee Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/473,921

(22) PCT Filed: Dec. 21, 2017

(86) PCT No.: PCT/KR2017/015252
§ 371 (c)(1),
(2) Date: Jun. 26, 2019

(87) PCT Pub. No.: WO2018/124637
PCT Pub. Date: Jul. 5, 2018

(65) Prior Publication Data
US 2019/0356176 A1 Nov. 21, 2019

(30) Foreign Application Priority Data
Dec. 26, 2016 (KR) .......................... 10-2016-0179199

(51) Int. Cl.
*H02J 50/60* (2016.01)
*H02J 50/80* (2016.01)
(Continued)

(52) U.S. Cl.
CPC .............. *H02J 50/60* (2016.02); *H02J 7/025* (2013.01); *H02J 50/12* (2016.02); *H02J 50/80* (2016.02); *H04B 5/0037* (2013.01); *H04W 4/20* (2013.01)

(58) Field of Classification Search
CPC ....... H04W 12/06; H04W 4/50; H04W 4/021; H04W 4/023; H04W 4/24; H04W 4/20
See application file for complete search history.

(56) References Cited

U.S. PATENT DOCUMENTS

2010/0093428 A1* 4/2010 Mattice ............... G07F 17/3239
463/25
2014/0015334 A1 1/2014 Jung et al.
(Continued)

FOREIGN PATENT DOCUMENTS

KR 1020120077448 7/2012
KR 1020140008130 1/2014
(Continued)

OTHER PUBLICATIONS

PCT/ISA/210 Search Report issued on PCT/KR2017/015252, pp. 5.
PCT/ISA/237 Written Opinion issued on PCT/KR2017/015252, pp. 7.

*Primary Examiner* — Diane D Mizrahi
(74) *Attorney, Agent, or Firm* — The Farrell Law Firm, P.C.

(57) ABSTRACT

According to various embodiments, an electronic device comprises: a near-field communication unit; and a control unit electrically connected to the near-field communication unit, wherein the control unit can be configured to detect whether a foreign object is located between the electronic device and a first electronic device by using the near-field communication unit before performing wireless charging with the first electronic device which provides power wirelessly.

13 Claims, 9 Drawing Sheets

(51) Int. Cl.
  *H02J 50/12* (2016.01)
  *H02J 7/02* (2016.01)
  *H04B 5/00* (2006.01)
  *H04W 4/20* (2018.01)

(56) References Cited

U.S. PATENT DOCUMENTS

| | | | |
|---|---|---|---|
| 2014/0253026 A1 | 9/2014 | Du et al. | |
| 2015/0348009 A1* | 12/2015 | Brown | G06Q 20/3227 705/16 |
| 2016/0300211 A1* | 10/2016 | Brown | G06Q 20/3227 |
| 2017/0331334 A1 | 11/2017 | Park | |

FOREIGN PATENT DOCUMENTS

| | | |
|---|---|---|
| KR | 1020140008273 | 1/2014 |
| KR | 1020140110673 | 9/2014 |
| KR | 1020150012646 | 2/2015 |
| KR | 1020150019873 | 2/2015 |
| KR | 1020150129575 | 11/2015 |
| KR | 1020160061121 | 5/2016 |

\* cited by examiner

Communication Packet Transmission Interval Table

| Communication Packet Interval Table | Vendor A | ...... | Vendor Z | |
|---|---|---|---|---|
| xx Watts | xx ms | ...... | zzz ms | ← 510, 520a |
| yy Watts | yy ms | ...... | www ms | ← 520b |

FIG.5

ELECTRONIC DEVICE AND FOREIGN OBJECT DETECTION METHOD FOR ELECTRONIC DEVICE

PRIORITY

This application is a National Phase Entry of PCT International Application No. PCT/KR2017/015252, which was filed on Dec. 21, 2017, and claims priority to Korean Patent Application No. 10-2016-0179199, which was filed on Dec. 26, 2016, the contents of which are incorporated herein by reference.

BACKGROUND

1. Field

The present disclosure relates to an electronic device and a foreign object detection method for the electronic device.

2. Description of the Related Art

In view of its nature, a mobile terminal such as a portable phone or a personal digital assistant (PDA) operates with a rechargeable battery. To charge the battery, a separate charger is used to supply electric energy to the battery of the mobile terminal. In general, each of the charger and the battery has a contact terminal on the exterior thereof, and the charger and the battery are electrically coupled to each other by bringing the contact terminals into contact.

Because the contact terminals are exposed outward and thus vulnerable to contamination, the battery may not charge normally in this contact charging scheme. Moreover, when the contact terminals are exposed to moisture the battery may not charge normally.

To overcome these problems, wireless charging or contactless charging techniques have recently been developed and used for a number of electronic devices.

Wireless charging is carried out by wireless power transmission and reception. For example, once a portable phone is placed on a charging pad without a connection via a charging connector, the battery is automatically charged. As the wireless charging technology has already been used for wireless electric toothbrushes or wireless electric shavers, it is well-known to users. The wireless charging technology offers the benefits of enhanced waterproofness attributed to wireless charging, and increased portability of an electronic device due to no need for a wired charger. It is expected that the upcoming electric vehicle era will witness great development in technologies related to wireless charging.

Wireless charging is performed largely by coil-based electromagnetic induction, resonance, or radio frequency (RF)/microwave radiation that converts electric energy to microwaves.

SUMMARY

In a conventional wireless charging system, if there is a foreign material or an external object between a first electronic device (e.g., a wireless power receiver) and a second electronic device that supplies wireless power (e.g., a wireless power transmitter) during wireless charging through wireless power reception from the second electronic device in the first electronic device, more heat may be generated on a surface of the first electronic device or on the foreign material or the external object, thereby causing an ignition.

For example, when the first electronic device with a protection case into which a foreign material or an external object (e.g., a credit card) is insertable and which surrounds only the rear surface of the first electronic device which is cradled on the second electronic device and the first electronic device is being charged wirelessly, more heat may be emanated than when the first electronic device is wirelessly charged without the protection case or with the protection case without an inserted foreign material or external object, even under the same wireless charging condition. Therefore, an ignition may occur to the foreign material or external object inserted in the protection case of the first electronic device or on the surface of the first electronic device.

An aspect of the present disclosure is to provide an electronic device that detects a foreign material or an external object (hereinafter, collectively referred to as a foreign object) before wireless charging and a foreign object detection method.

According to various embodiments, an electronic device may include a short-range communication unit, and a controller electrically coupled to the short-range communication unit. The controller may be configured to identify whether a foreign object is located between the electronic device and a first electronic device supplying wireless power by means of the short-range communication unit before performing wireless charging with the first electronic device.

According to various embodiments, a method of detecting a foreign object in an electronic device may include activating a short-range communication unit before wireless charging is performed with a first electronic device supplying wireless power, and identifying whether a foreign object is located between the electronic device and the first electronic device by means of the short-range communication unit.

According to the electronic device and the foreign object detection method for the electronic device according to various embodiments, a foreign object is detected before wireless charging, thereby preventing an ignition on the surface of the electronic device or at the foreign object.

BRIEF DESCRIPTION OF THE DRAWINGS

FIG. 5 illustrates a table listing communication packet transmission intervals according to types of wireless charging chips, stored in a memory according to various embodiments of the present disclosure.

DETAILED DESCRIPTION

Figure 1:
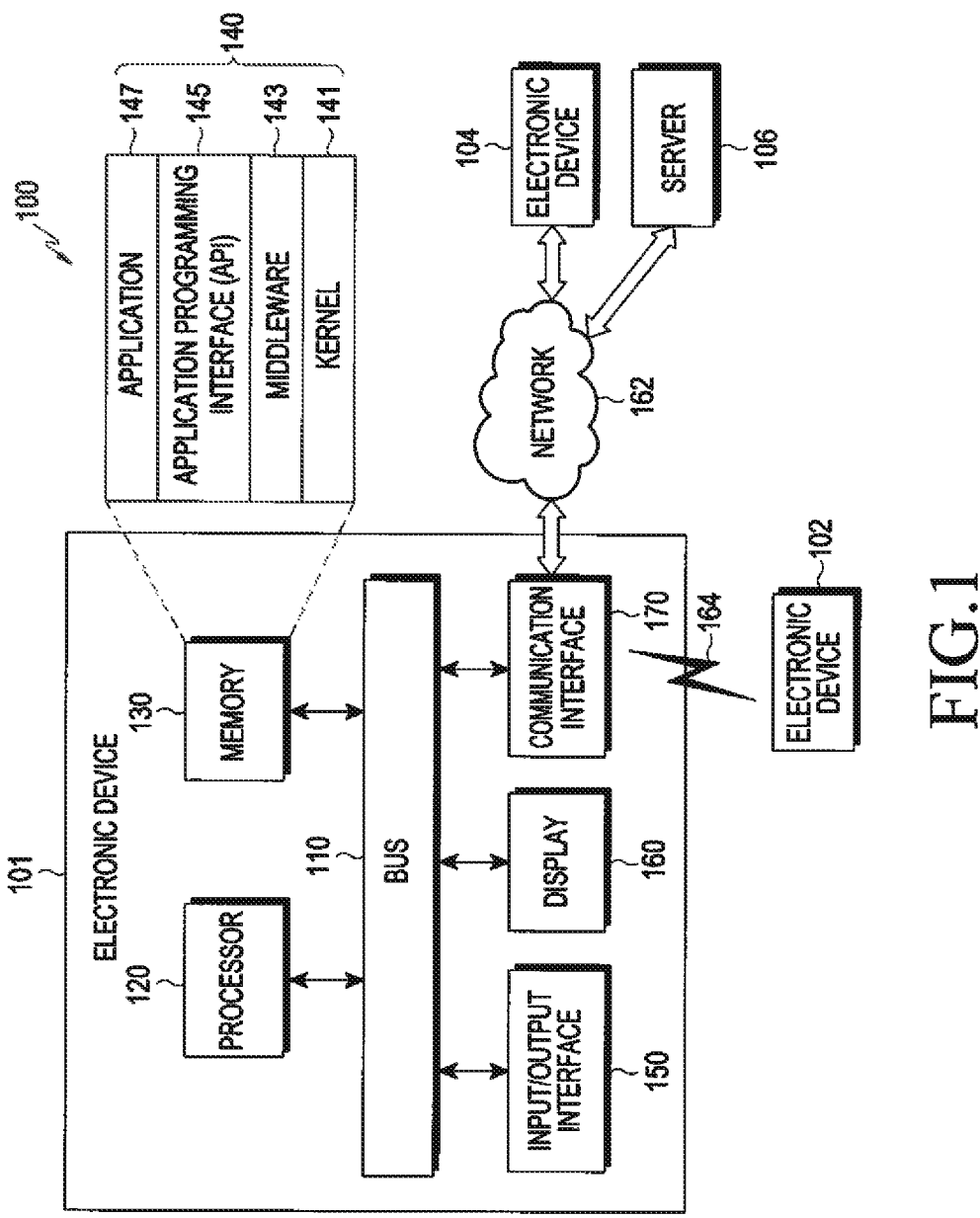
FIG. 1 illustrates a network environment according to various embodiments.

Various embodiments of the present disclosure are described with reference to the accompanying drawings. However, the scope of the present disclosure is not intended to be limited to the particular embodiments, and it is to be understood that the present disclosure covers various modifications, equivalents, and/or alternatives. With regard to the description of the drawings, similar reference numerals may be used to refer to similar elements.

In the present disclosure, the term "have", "may have", "include" or "may include" signifies the presence of a feature (e.g., number, function, operation, or component like a part), not excluding the presence of one or more other features.

As used herein, each of such phrases as "A or B", "at least one of A and/or B", or "one or more of A and/or B" may include all possible combinations of the items enumerated together in a corresponding one of the phrases. For example, "A or B", "at least one of A and B", or "at least one of A or B" may represent all of the cases of (1) inclusion of at least one A, (2) inclusion of at least one B, and (3) inclusion of at least one A and at least one B.

The term as used in the present disclosure, "$1^{st}$", "$2^{nd}$", "first" or "second' may be used for the names of various components irrespective of sequence and/or importance, not limiting the components. These expressions are used to distinguish one component from another component. For example, a first user equipment (UE) and a second UE may indicate different UEs irrespective of sequence or importance. For example, a first component may be referred to as a second component and vice versa without departing from the scope of the disclosure.

When it is said that a component (e.g., a first component) is "(operatively or communicatively) coupled with/to" or "connected to" another component (e.g., a second component), it should be understood that the one component is connected to the other component directly or through any other component (e.g., a third component). On the other hand, when it is said that a component (e.g., a first component) is "directly connected to" or "directly coupled to" another component (e.g., a second component), it may be understood that there is no other component (e.g., a third component) between the components.

The term "configured to" as used herein may be interchangeably used with, for example, the term "suitable for", "having the capacity to", "designed to", "adapted to", "made to", or "capable of" under circumstances. The term "configured to" may not necessarily mean only "specifically designed to" in hardware. Under some circumstances, the term "a device configured to" may mean that the device may be "capable of" with another device or part. For example, "a processor designed (or configured) to execute A, B, and C" may mean a dedicated processor (e.g., an embedded processor) for performing the corresponding operations or a generic-purpose processor (e.g., a central processing unit (CPU) or an application processor) for performing the operations by executing one or more software programs stored in a memory device.

The terms as used in the present disclosure are provided to describe merely specific embodiments, not intended to limit the scope of other embodiments. It is to be understood that singular forms include plural referents unless the context clearly dictates otherwise. The terms including technical or scientific terms used in the disclosure may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings. When needed, even the terms as defined in the present disclosure may not be interpreted as excluding embodiments of the present disclosure.

An electronic device according to various embodiments of the disclosure may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, mobile medical equipment, a camera, or a wearable device. According to various embodiments, the wearable device may include at least one of an accessory type (e.g., a watch, a ring, a bracelet, an ankle bracelet, a necklace, glasses, contact lenses, or a head-mounted device (HMD)), a fabric or clothes type (e.g., electronic clothes), a body-attached type (e.g., a skin pad or tattoo), or an implantable circuit.

According to some embodiments, an electronic device may be a home appliance. The home appliance may include at least one of, for example, a television, a digital versatile disk (DVD) player, an audio player, a refrigerator, an air conditioner, a vacuum cleaner, an oven, a microwave oven, a washer, an air purifier, a set-top box, a home automation control panel, a security control panel, a media box (e.g., Samsung HomeSync™, Apple TV™, or Google TV™), a game console (e.g., Xbox™ or PlayStation™), an electronic dictionary, an electronic key, a camcorder, or an electronic picture frame.

According to other embodiments, an electronic device may include at least one of a medical device (e.g., a portable medical meter (a blood glucose meter, a heart rate meter, a blood pressure meter, a body temperature meter, or the like), a magnetic resonance angiography (MRA) device, a magnetic resonance imaging (MRI) device, a computed tomography (CT) device, an imaging device, an ultrasonic device, or the like), a navigation device, a global navigation satellite system (GNSS), an event data recorder (EDR), a flight data recorder (FDR), an automotive infotainment device, a naval electronic device (e.g., a naval navigation device, a gyrocompass, or the like), an avionic electronic device, a security device, an in-vehicle head unit, an industrial or consumer robot, an automatic teller machine (ATM) in a financial facility, a point of sale (POS) device in a shop, or an Internet of things device (e.g., a lighting bulb, various sensors, an electricity or gas meter, a sprinkler, a fire alarm, a thermostat, a street lamp, a toaster, sporting goods, a hot water tank, a heater, a boiler, or the like).

According to some embodiments, an electronic device may include at least one of furniture, part of a building/structure, an electronic board, an electronic signature receiving device, a projector, or various measuring devices (e.g., a water, electricity, gas or electromagnetic wave measuring device). According to various embodiments, an electronic device may be one or a combination of two or more of the foregoing devices. According to various embodiments, an electronic device may be flexible. An electronic device according to an embodiment of the disclosure may include a new electronic device which will emerge along with technology development, not limited to the foregoing devices.

With reference to the attached drawings, an electronic device according to various embodiments will be described. In the disclosure, the term user may refer to a person or device (e.g., artificial intelligence electronic device) that uses an electronic device.

Referring to FIG. 1, an electronic device 101 in a network environment 100 according to various embodiments is described. The electronic device 101 may include a bus 110, a processor 120, a memory 130, an input/output (I/O) interface 150, a display 160, and a communication interface 170. In some embodiments, at least one of the components may be omitted in the electronic device 101 or a component may be added to the electronic device 101.

The bus 110 may interconnect the foregoing components 120, 130, and 150 to 170, and include a circuit which allows communication (e.g., transmission of control messages and/or data) between the foregoing components.

The processor 120 may include one or more of a CPU, an application processor (AP), or a communication processor (CP). The processor 120 may, for example, execute computation or data processing related to control and/or communication of at least one other component of the electronic device 101. The processor 120 may be referred to as a controller, include a controller as its part, or form a controller.

The memory 130 may include a volatile memory and/or a non-volatile memory. The memory 130 may, for example, store instructions or data related to at least one other component of the electronic device 101. According to an embodiment, the memory 130 may store software and/or a program 140. The program 140 may include, for example, a kernel 141, middleware 143, an application programming interface (API) 145, and/or an application program (or "application") 147. At least a part of the kernel 141, the middleware 143, or the API 145 may be called an operating system (OS).

The kernel 141 may control or manage system resources (e.g., the bus 110, the processor 120, or the memory 130) that are used in executing operations or functions implemented in other programs (e.g., the middleware 143, the API 145, or the application programs 147). Also, the kernel 141 may provide an interface for allowing the middleware 143, the API 145, or the application programs 147 to access individual components of the electronic device 101 and control or manage system resources.

The middleware 143 may serve as a medium through which the kernel 141 may communicate with, for example, the API 145 or the application programs 147 to transmit and receive data.

Also, the middleware 143 may process one or more task requests received from the application programs 147 according to priority levels. For example, the middleware 143 may assign priority levels for using system resources (e.g., the bus 110, the processor 120, or the memory 130) of the electronic device 101 to at least one of the application programs 147. For example, the middleware 143 may process the one or more task requests according to the priority levels assigned to the at least one application program 147, thereby performing scheduling or load balancing for the one or more task requests.

The API 145 is an interface through which the application programs 147 control functions provided by, for example, the kernel 141 or the middleware 143. For example, the API 145 may include at least one interface or function (e.g., a command) for file control, window control, video processing, or text control.

The I/O interface 150 may output a command or data received from the user or an external device to the other component(s) of the electronic device 101. Further, the I/O interface 150 may output a command or data received from the other component(s) of the electronic device 101 to the user or the external device.

The display 160 may include, for example, a liquid crystal display (LCD), a light emitting diode (LED) display, an organic LED (OLED) display, a microelectromechanical systems (MEMS) display, or an electronic paper display. The display 160 may display, for example, various types of content (e.g., text, an image, a video, an icon, or a symbol) to the user. The display 160 may include a touch screen and receive, for example, a touch input, a gesture input, a proximity input, or a hovering input through an electronic pen or a user's body part.

The communication interface 170 may establish communication, for example, between the electronic device 101 and an external device (e.g., a first external electronic device 102, a second external electronic device 104, or a server 106). For example, the communication interface 170 may be connected to a network 162 by wireless communication or wired communication and communicate with the external device (e.g., the second external electronic device 104 or the server 106) over the network 162. The communication interface 170 may include a CP, and the CP may form one of a plurality of modules in the communication interface 170. According to an embodiment, the CP may be incorporated in the processor 120.

The wireless communication may include cellular communication using, for example, at least one of long-term evolution (LTE), LTE-Advanced (LTE-A), code division multiple access (CDMA), wideband CDMA (WCDMA), universal mobile telecommunication system (UMTS), Wireless Broadband (WiBro), or global system for mobile communications (GSM). Further, the wireless communication may include, for example, short-range communication 164. The short-range communication 164 may include at least one of, for example, wireless fidelity (WiFi), Bluetooth, near field communication (NFC), or global navigation satellite system (GNSS). GNSS may include at least one of, for example, global positioning system (GPS), global navigation satellite system (Glonass), Beidou navigation satellite system (hereinafter, referred to as "Beidou"), or Galileo, the European global satellite-based navigation system, according to a use region or bandwidth. In the disclosure, the terms "GPS" and "GNSS" are interchangeably used with each other. The wired communication may include, for example, at least one of universal serial bus (USB), high definition multimedia interface (HDMI), recommended standard 232 (RS-232), or plain old telephone service (POTS). The network 162 may be a telecommunication network, for example, at least one of a computer network (e.g., LAN or WAN), the Internet, or a telephone network.

Each of the first and second external electronic devices 102 and 104 may be of the same type as or a different type from the electronic device 101. According to various embodiments, all or a part of operations performed in the electronic device 101 may be performed in one or more other electronic devices (e.g., the electronic devices 102 and 104) or the server 106. According to an embodiment, if the electronic device 101 is to perform a function or a service automatically or upon request, the electronic device 101 may request at least a part of functions related to the function or the service to another device (e.g., the electronic device 102 or 104 or the server 106), instead of performing the function or the service autonomously, or additionally. The other electronic device (e.g., the electronic device 102 or 104 or the server 106) may execute the requested function or an additional function, and provide a result of the function execution to the electronic device 101. The electronic device 101 may provide the requested function or service based on the received result or by additionally processing the received result. For this purpose, for example, cloud computing, distributed computing, or client-server computing may be used.

Figure 2:
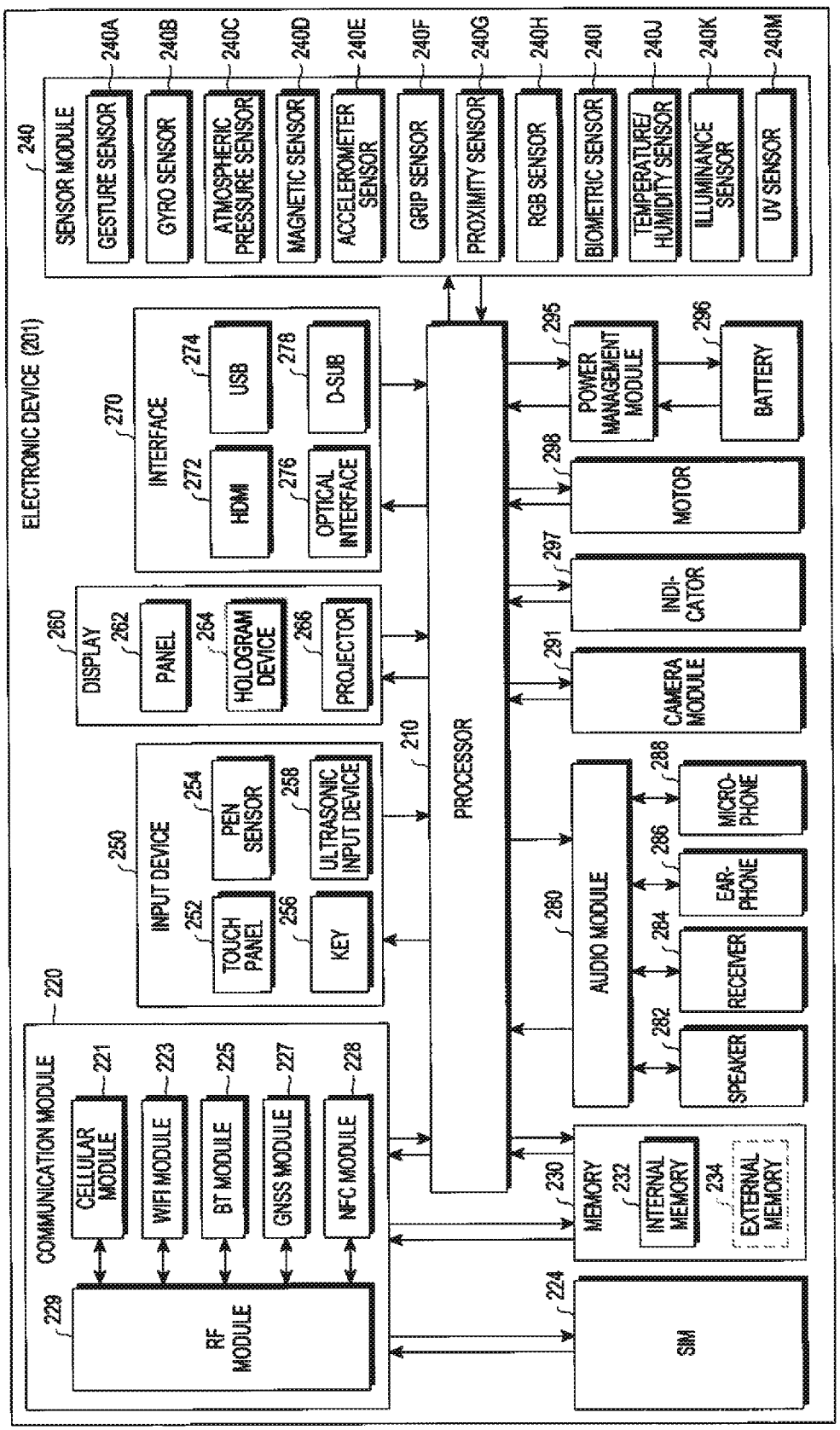
FIG. 2 is a block diagram of an electronic device according to various embodiments.

FIG. 2 is a block diagram of an electronic device 201 according to various embodiments. The electronic device 201 may include, for example, the whole or part of the electronic device 101 illustrated in FIG. 1. The electronic device 201 may include at least one processor (e.g., AP) 210, a communication module 220, a memory 230, a sensor module 240, an input device 250, and a display 260. The electronic device 201 may further include at least one of a subscriber identification module (SIM) 224, an interface 270, an audio module 280, a camera module 291, a power management module 295, a battery 296, an indicator 297, or a motor 298.

The processor 210 may, for example, control a plurality of hardware or software components which are connected to the processor 210 by executing an OS or an application program, and may perform processing of various types of data or computations. The processor 210 may be implemented, for example, as a system on chip (SoC). According to an embodiment, the processor 210 may further include a graphic processing unit (GPU) and/or an image signal processor. The processor 210 may include at least a part (e.g., a cellular module 221) of the components illustrated in FIG. 2. The processor 210 may load a command or data received from at least one of other components (e.g., a non-volatile memory), process the loaded command or data, and store various types of data in the non-volatile memory.

The communication module 220 may have the same configuration as or a similar configuration to the communication interface 170 illustrated in FIG. 1. The communication module 220 may include at least one of, for example, the cellular module 221, a WiFi module 223, a Bluetooth module 225, a GNSS module 227 (e.g., GPS module, Glonass module, Beidou module, or Galileo module), an NFC module 228, or an RF module 229.

The cellular module 221 may provide services such as voice call, video call, text service, or the Internet service, for example, through a communication network. According to an embodiment, the cellular module 221 may identify and authenticate the electronic device 201 within a communication network, using the SIM (e.g., a SIM card) 224. According to an embodiment, the cellular module 221 may perform at least a part of the functions of the processor 210. According to an embodiment, the cellular module 221 may include a CP.

Each of the WiFi module 223, the Bluetooth module 225, the GNSS module 227, and the NFC module 228 may include, for example, a processor for processing data transmitted and received through the module. According to some embodiments, at least a part (e.g., two or more) of the cellular module 221, the WiFi module 223, the Bluetooth module 225, the GNSS module 227, or the NFC module 228 may be included in a single integrated chip (IC) or IC package.

The RF module 229 may transmit and receive, for example, communication signals (e.g., RF signals). The RF module 229 may include, for example, a transceiver, a power amplifier module (PAM), a frequency filter, a low noise amplifier (LNA), an antenna, or the like. According to another embodiment, at least one of the cellular module 221, the WiFi module 223, the Bluetooth module 225, the GNSS module 227, or the NFC module 228 may transmit and receive RF signals via a separate RF module.

The SIM 224 may include, for example, a card including the SIM and/or an embedded SIM. The SIM 224 may include a unique identifier (e.g., integrated circuit card identifier (ICCID)) or subscriber information (e.g., international mobile subscriber identity (IMSI)).

The memory 230 (e.g., the memory 130) may include, for example, an internal memory 232 and/or an external memory 234. The internal memory 232 may be at least one of, for example, a volatile memory (e.g., dynamic RAM (DRAM), static RAM (SRAM), or synchronous dynamic RAM (SDRAM)), and a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory, a hard drive, or a solid state driver (SSD).

The external memory 234 may further include a flash drive such as a compact flash (CF) drive, a secure digital (SD), a micro secure digital (Micro-SD), a mini secure digital (Mini-SD), an extreme digital (xD), a multi-media card (MMC), or a memory stick. The external memory 234 may be operatively and/or physically coupled to the electronic device 201 via various interfaces.

The sensor module 240 may, for example, measure physical quantities or detect operational states of the electronic device 201, and convert the measured or detected information into electric signals. The sensor module 240 may include at least one of, for example, a gesture sensor 240A, a gyro sensor 240B, an atmospheric pressure sensor 240C, a magnetic sensor 240D, an accelerometer sensor 240E, a grip sensor 240F, a proximity sensor 240G, a color sensor (e.g., a red, green, blue (RGB) sensor) 240H, a biometric sensor 240I, a temperature/humidity sensor 240J, an illuminance sensor 240K, or an ultra violet (UV) sensor 240M. Additionally or alternatively, the sensor module 240 may include, for example, an e-nose sensor, an electromyogram (EMG) sensor, an electroencephaloeram (EEG) sensor, an electrocardiogram (ECG) sensor, an infrared (IR) sensor, an iris sensor, and/or a fingerprint sensor. The sensor module 240 may further include a control circuit for controlling one or more sensors included therein. According to some embodiments, the electronic device 201 may further include a processor configured to control the sensor module 240, as a part of or separately from the processor 210. Thus, while the processor 210 is in a sleep state, the control circuit may control the sensor module 240.

The input device 250 may include, for example, a touch panel 252. The input device 250 may further include at least one of a (digital) pen sensor 254, a key 256, or an ultrasonic input device 258. The touch panel 252 may operate in at least one of, for example, a capacitive, resistive, infrared, or ultrasonic scheme. The touch panel 252 may further include a control circuit. The touch panel 252 may further include a tactile layer to thereby provide haptic feedback to the user.

The (digital) pen sensor 254 may include, for example, a detection sheet which is a part of the touch panel or configured separately from the touch panel. The key 256 may include, for example, a physical button, an optical key, or a keypad. The ultrasonic input device 258 may sense ultrasonic signals generated by an input tool through a microphone (e.g., a microphone 288), and identify data corresponding to the sensed ultrasonic signals.

The display 260 (e.g., the display 160) may include a panel 262. The display 260 may further include a hologram device 264 and/or a projector 266. The panel 262 may be configured to be, for example, flexible, transparent, or wearable. The panel 262 and the touch panel 252 may be implemented into one module. The hologram device 264 may utilize the interference of light waves to provide a three-dimensional image in empty space. The projector 266 may display an image by projecting light on a screen. The screen may be positioned, for example, inside or outside the electronic device 201. According to an embodiment, the display 260 may further include a control circuit for controlling the panel 262, the hologram device 264, or the projector 266.

The interface 270 may include at least one of, for example, an HDMI 272, a USB 274, an optical interface 276, or a D-subminiature (D-sub) 278. The interface 270 may be included, for example, in the communication interface 170 illustrated in FIG. 1. Additionally or alternatively, the interface 270 may include, for example, a mobile high-definition link (MHL) interface, an SD card/multi-media card (MMC) interface, or an infrared data association (IrDA) interface.

The audio module 280 may, for example, convert a sound to an electrical signal, and vice versa. At least a part of the components of the audio module 280 may be included, for example, in the I/O interface 150 illustrated in FIG. 1. The audio module 280 may process sound information input into, or output from, for example, a speaker 282, a receiver 284, an earphone 286, or the microphone 288.

The camera module 291 may capture, for example, still images and a video. According to an embodiment, the camera module 291 may include one or more image sensors (e.g., a front sensor or a rear sensor), a lens, an image signal processor (ISP), or a flash (e.g., an LED or a xenon lamp).

The power management module 295 may manage power of, for example, the electronic device 201. According to an embodiment, the power management module 295 may include a power management integrated circuit (PMIC), a charger IC, or a battery or fuel gauge. The PMIC may adopt wired and/or wireless charging. The wireless charging may be performed, for example, in a magnetic resonance scheme, a magnetic induction scheme, or an electromagnetic wave scheme, and may further include an additional circuit for wireless charging, for example, a coil loop, a resonance circuit, or a rectifier. The battery gauge may measure, for example, a charge level, a voltage while charging, current, or temperature of the battery 296. The battery 296 may include, for example, a rechargeable battery and/or a solar battery.

The indicator 297 may indicate specific states of the electronic device 201 or a part of the electronic device 201 (e.g., the processor 210), for example, boot status, message status, or charge status. The motor 298 may convert an electrical signal into a mechanical vibration, and generate vibrations or a haptic effect. While not shown, the electronic device 201 may include a processing device for supporting mobile TV (e.g., a GPU). The processing device for supporting mobile TV may process media data compliant with, for example, digital multimedia broadcasting (DMB), digital video broadcasting (DVB), or MediaFlo™.

Each of the above-described components of the electronic device may include one or more parts, and the name of the component may vary with the type of the electronic device. According to various embodiments, some component may be omitted from or added to the electronic device. Or one entity may be configured by combining a part of the components of the electronic device, to thereby perform the same functions of the components prior to the combination.

Figure 3:
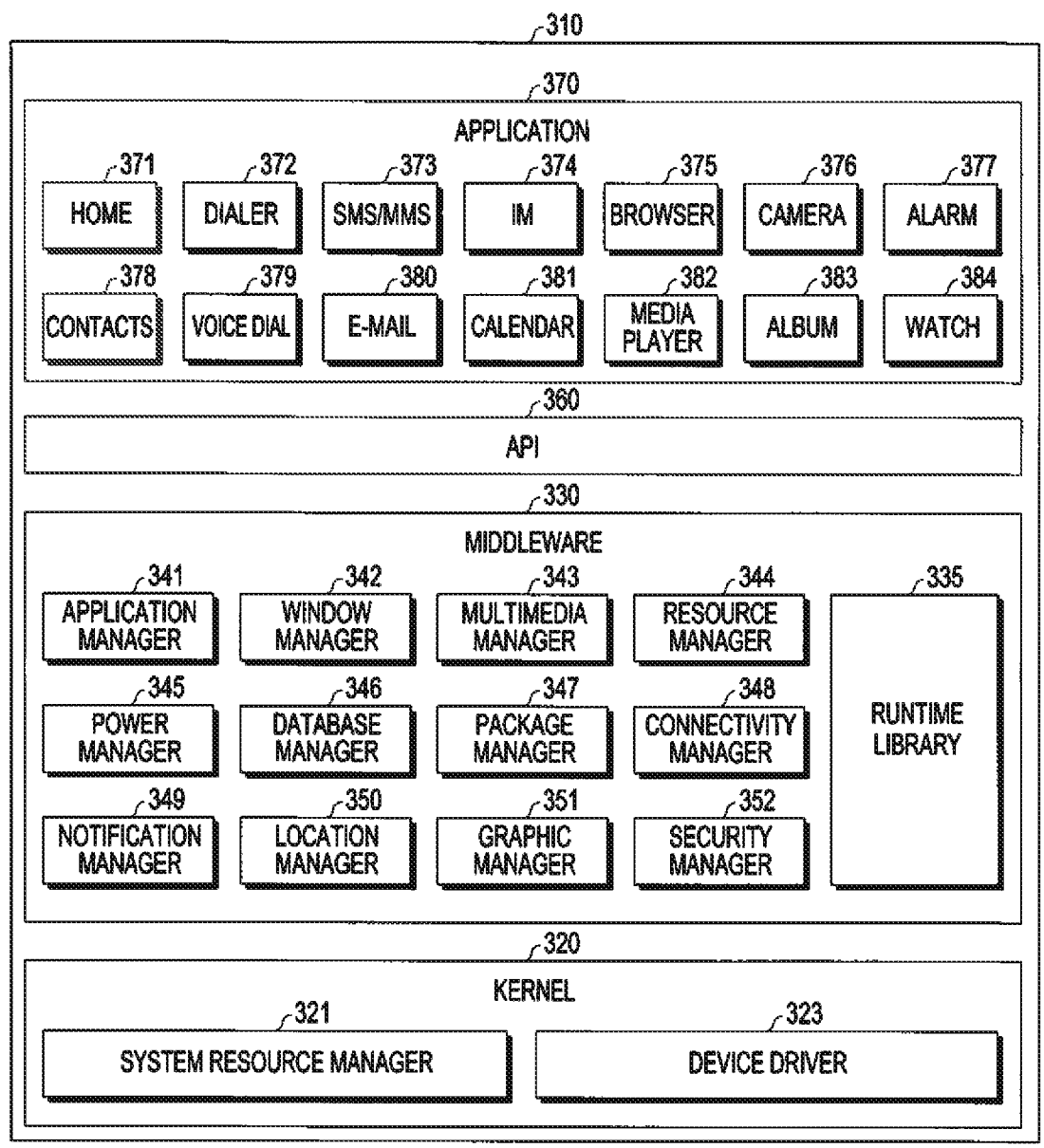
FIG. 3 is a block diagram of a programming module according to various embodiments.

FIG. 3 is a block diagram of a programming module according to various embodiments. According to an embodiment, a programming module 310 (e.g., the program 140) may include an OS that controls resources related to an electronic device (e.g., the electronic device 101) and/or various applications (e.g., the application programs 147) executed on the OS. For example, the OS may be Android™, iOS™, Windows, Symbian™, Tizen™, or Bada™.

The programming module 310 may include a kernel 320, middleware 330, an API 360, and/or applications 370. At least a part of the programming module 310 may be pre-loaded on the electronic device or downloaded from an external electronic device (e.g., the electronic device 102 or 104, or the server 106).

The kernel 320 may include, for example, a system resource manager 321 and/or a device driver 323. The system resource manager 321 may control, allocate, or deallocate system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a WiFi driver, an audio driver, or an inter-process communication (IPC) driver.

The middleware 330 may, for example, provide a function required commonly for the applications 370 or provide various functions to the applications 370 through the API 360 so that the applications 370 may efficiently use limited system resources available within the electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that a complier uses to add a new function in a programming language during execution of an application 370. The runtime library 335 may perform input/output management, memory management, a function related to arithmetic function, or the like.

The application manager 341 may manage, for example, the life cycle of at least one of the applications 370. The window manager 342 may manage GUI resources used for a screen. The multimedia manager 343 may determine formats required to play back various media files, and may encode or decode a media file using a CODEC suitable for the format of the media file. The resource manager 344 may manage source codes of the applications 370, or a memory space.

The power manager 345 may, for example, manage a battery capacity or a power source in conjunction with a basic input/output system (BIOS), and may provide power information required for an operation of the electronic device. The database manager 346 may generate, search, or modify a database for at least one of the applications 370. The package manager 347 may manage installation or update of an application distributed as a package file.

The connectivity manager 348 may manage, for example, wireless connectivity such as WiFi or Bluetooth. The notification manager 349 may provide an event such as message arrival, a schedule, a proximity alarm, or the like to a user. The location manager 350 may mange, for example, position information about the electronic device. The graphic manager 351 may manage graphical effects to be provided to the user or related user interfaces. The security manager 352 may provide overall security functions required for system security or user authentication. According to an embodiment, if the electronic device (e.g., the electronic device 101) includes a call function, the middleware 330 may include a telephony manager to manage a voice or video call function of the electronic device.

The middleware 330 may include a middleware module that combines various functions of the above-described components. The middleware 330 may provide a customized module for each OS type to provide differential functions. Further, the middleware 330 may dynamically delete a part of the existing components or add a new component.

The API 360 (e.g., the API 145) is, for example, a set of API programming functions, which may be configured differently according to an OS. For example, in the case of Android or iOS, one API set may be provided per platform, whereas in the case of Tizen, two or more API sets may be provided per platform.

The applications 370 (e.g., the application programs 147) may include applications such as home 371, dialer 372, short message service/multimedia messaging service (SMS/MMS) 373, instant message (IM) 374, browser 375, camera 376, alarm 377, contacts 378, voice dial 379, email 380, calendar 381, media player 382, album 383, or watch 384, health care (e.g., measurement of an exercise amount or a glucose level), or providing of environment information (e.g., information about atmospheric pressure, humidity, or temperature).

According to an embodiment, the applications 370 may include an information exchange application supporting information exchange between the electronic device (e.g., the electronic device 101) and an external electronic device (e.g., the electronic device 102 or 104). The information exchange application may include, for example, a notification relay application for transmitting specific information to the external electronic device or a device management application for managing the external electronic device.

For example, the notification relay application may include a function of transmitting notification information generated from another application (e.g., an SMS/MMS application, an email application, a healthcare application, or an environmental information application) to the external electronic device (e.g., the electronic device 102 or 104). Also, the notification relay application may receive notification information from the external electronic device and transmit the received notification information to a user.

The device management application may, for example, manage (e.g., install, delete, or update) at least one of functions of the external electronic device communicating with the electronic device (e.g., turn-on/turn-off of the external electronic device (or a part of its components) or control of the brightness (or resolution) of the display)), an application executed in the external electronic device, or a service (e.g., a call service or a message service) provided by the external electronic device.

According to an embodiment, the applications 370 may include an application (e.g., a healthcare application of mobile medical equipment) designated according to a property of the external electronic device (e.g., the electronic device 102 or 104). According to an embodiment, the applications 370 may include an application received from an external electronic device (e.g., the server 106 or the electronic device 102 or 104). According to an embodiment, the applications 370 may include a preloaded application or a third party application downloadable from the server. The names of the components of the programming module 310 according to the illustrated embodiment may vary according to OS types.

According to various embodiments, at least a part of the programming module 310 may be configured in software, firmware, hardware, or a combination of at least two of them. At least a part of the programming module 310 may be implemented by, for example, a processor (e.g., the processor 210). At least a part of the programming module 310 may include, for example, a module, a program, a routine, a set of instructions, or a process to execute one or more functions.

Figure 4:
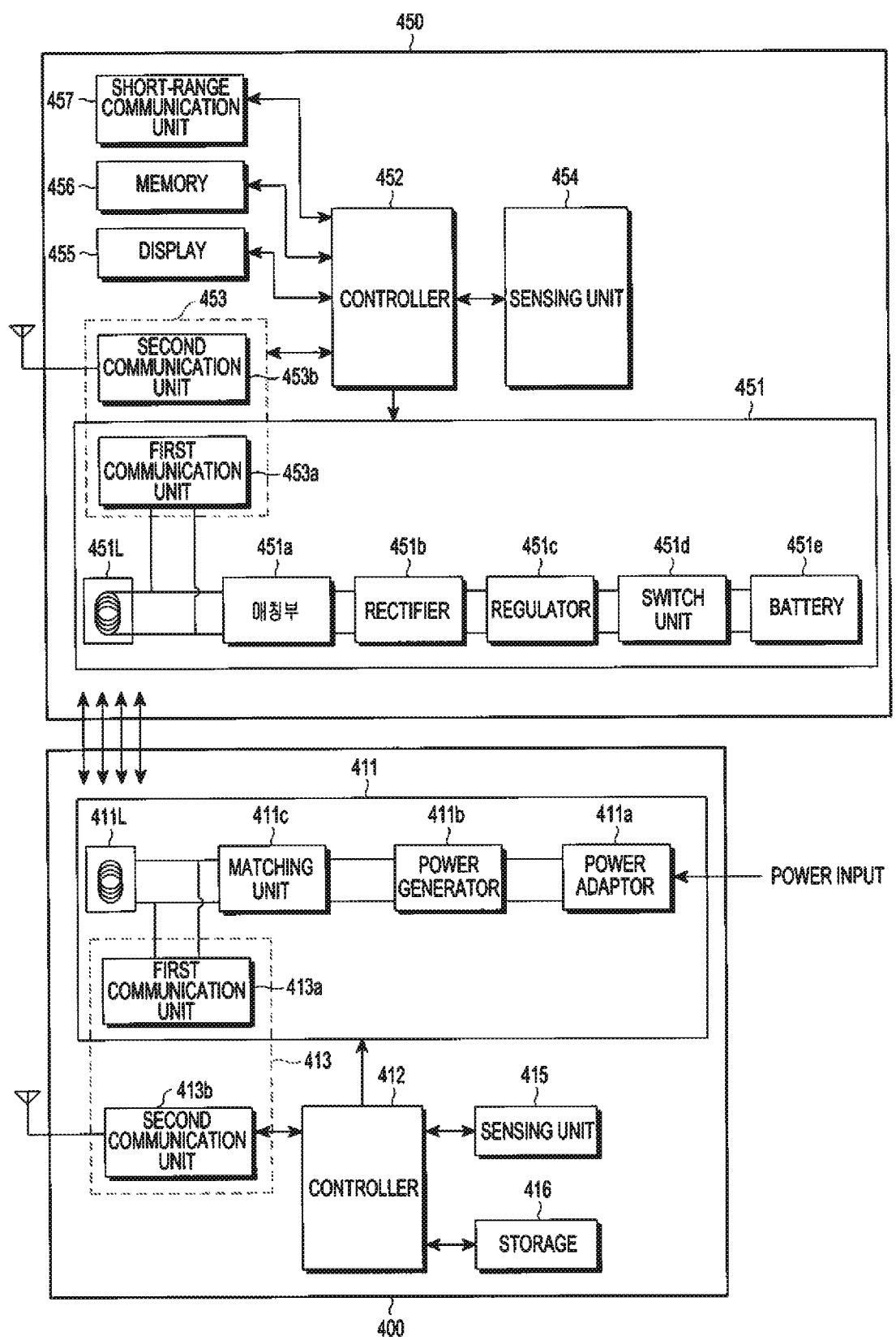
FIG. 4 is a block diagram of a wireless charging system according to various embodiments of the present disclosure.

FIG. 4 is a block diagram of a wireless charging system according to various embodiments of the present disclosure.

Referring to FIG. 4, a wireless charging system according to various embodiments of the present disclosure may include a first electronic device 450 for receiving wireless power and a second electronic device 400 for transmitting the wireless power.

The first electronic device 450 may include the whole or part of the electronic device 101 illustrated in FIG. 1 and the electronic device 201 illustrated in FIG. 2. The second electronic device 400 may include the whole or part of the external electronic device 102 or 104 illustrated in FIG. 1.

The first electronic device 450 according to various embodiments of the present disclosure may include a power receiver 451, a controller 452, a communication unit 453, a sensing unit 454, a display 455, a memory 456, and a short-range communication unit 457.

According to various embodiments, the power receiver 451 may receive power from a power transmitter 411 of the second electronic device 400. The power receiver 451 may be configured as a built-in battery or a power receiving interface to receive external power. The power receiver 451 may include a loop coil 451L formed in a conductive pattern. The power receiver 451 may receive, through the loop coil 451L, wireless power in the form of electromagnetic waves generated in correspondence with a current/voltage applied to a loop coil 411L of the power transmitter 411. For example, the power receiver 451 may receive, from the power transmitter 411, power which is induced electromotive force caused by alternating current (AC) waveform power applied to the loop coil 411L of the power transmitter 411 and then supplied to the loop coil 451L of the adjacent power receiver 451.

The power receiver 451 may further include, for example, a matching unit 451a, a rectifier 451b, a regulator 451c, a switch unit 451d, and a battery 451e, in addition to the loop coil 451L.

The matching unit 451a may perform impedance matching. For example, power transmitted through the loop coil 411L of the second electronic device 400 may be transferred to the loop coil 451L, thus forming an electromagnetic field. Herein, the matching unit 451a may adjust the frequency band of the electromagnetic field signal by adjusting impedance. The matching unit 451a may control input power received from the second electronic device 400 through the loop coil 451L by the impedance adjustment so that the input power has high efficiency and high output. The matching unit 451a may adjust impedance under the control of the controller 452. The matching unit 451a may include at least one of an inductor (e.g., a coil), a capacitor, or a switch device. The controller 452 may control the state of connection to at least one of the inductor or the capacitor through the switch device, and perform impedance matching accordingly.

The rectifier 451b may rectify the wireless power received at the loop coil 451L to direct current (DC) waveforms. For example, the rectifier 451b may be configured as a bridge diode.

The regulator 451c may convert the rectified power to a predetermined gain. The regulator 451c may include a predetermined DC/DC converter (not shown). For example, the regulator 451c may convert the rectified power so that the power of an output end is 5V.

Minimum and maximum values of a voltage applicable to a front end of the regulator 451c may be predetermined.

The switch unit 451d may connect the regulator 451c to the battery 451e.

The switch unit 451d may be kept on or off under the control of the controller 452.

When the switch unit 451d is in an on-state, the battery 451e may receive input power from the regulator 451c and be charged with the power.

According to various embodiments, the sensing unit 454 may sense a change in the state of power received at the first electronic device 450. For example, the sensing unit 454 may periodically or aperiodically measure a current/voltage value received at the loop coil 451L through a predetermined current/voltage sensor 454a. The first electronic device 450 may calculate the amount of received power based on the measured current/voltage.

According to various embodiments, overall information related to the charging state of the first electronic device 450 on the display 455. For example, the display 455 may display at least one of a total battery capacity, battery remainder, battery charged amount, used battery capacity, or expected time for charging of the first electronic device 450.

According to an embodiment, when a foreign object (e.g., a credit card that can be used as a traffic card using NFC) is detected between the first electronic device 450 and the second electronic device 400, information indicating that a foreign object has been detected between the first electronic device 450 and the second electronic device 400 may be displayed on the display 455.

According to various embodiments, the communication unit 453 may conduct communication with the second electronic device 400 in a predetermined scheme. The communication unit 453 may conduct data communication with a communication unit 413 of the second electronic device 400. For example, the communication unit 453 may transmit a signal for information about the first electronic device 450 (e.g., at least one of charging setting information, power amount control information, environment information, or time information).

Further, the communication unit 453 may receive a signal for information about the second electronic device 400. For example, the communication unit 453 may receive, from the second electronic device 400, a charging function control signal for controlling a charging function of the first electronic device 450. The charging function control signal may be a control signal that enables or disables the charging function by controlling the power receiver 451 of a specific electronic device (e.g., the first electronic device 450). The communication unit 453 may unicast, multicast, or broadcast the signal. The communication unit 453 may receive a signal from or transmit a signal to another wireless power transmission apparatus (not shown) as well as the second electronic device 400.

The communication unit 453 and the power receiver 451 may be incorporated into one hardware component, and include at least one of a first communication unit 453a for enabling the first electronic device 450 to communicate in an in-band manner, or a second communication unit 453b for enabling the first electronic device 450 in an out-of-band manner. The communication unit 453 may be configured to be identical to the communication unit 413 of the second electronic device 400, except that the function of the communication unit 413 is performed in a reverse order. Accordingly, for a detailed description of the in-band communication and the out-of-band communication, the description of the communication unit 413 of the second electronic device 400 is referred to.

According to an embodiment, the communication unit 453 may receive a power supply discovery signal (e.g., analog ping) from the second electronic device 400, and transmit a power supply discovery response signal to the second electronic device 400. The communication unit 453 may receive, from the second electronic device 400, a signal (e.g., digital ping) requesting information about the first electronic device 450, for communication with the first electronic device 450, and transmit, to the second electronic device 400, a signal including information (e.g., a signal strength, an ID, or the like) about the first electronic device 400.

According to some embodiments, the memory 456 may be the memory 130 illustrated in FIG. 1 or the memory 230 illustrated in FIG. 2.

According to an embodiment, the memory 456 may store a transmission interval for communication information (e.g., a communication packet) of the electronic device according to the type of a wireless charging chip (e.g., the power receiver 451 and the first communication unit 453a) installed for wireless charging of the first electronic device 450, in order to activate the short-range communication unit 457 for foreign object detection. With reference to FIG. 5, a description will be given of transmission intervals for communication information (e.g., communication packet) of an electronic device according to the types of wireless charging chips, stored in the memory 456.

FIG. 5 illustrates a table listing communication packet transmission intervals according to the types of wireless charging chips, stored in a memory according to various embodiments of the present disclosure.

According to FIG. 5, a communication packet transmission interval table may be stored in the memory 456 of the first electronic device 450. The table may list communication packet transmission intervals (ms) for each of the types 510 and charging modes of wireless charging chips, for example, a first mode 520a in which low-power wireless charging may be performed (first power charging 5 W) and a second mode 520b in which mid-power wireless charging may be performed (second power charging 9 W). Venders representing the types 510 of the wireless charging chips provide a function to ensure software compatibility so that one model may be implemented by means of a chip designed to execute the same function in each of a plurality of IC manufacturers.

After receiving information about the first electronic device 450, the second electronic device 400 enters a power supply waiting mode and awaits reception of a communication packet from the first electronic device 450. Upon receipt of an initial communication packet from the first electronic device 450, the second electronic device 400 may start to transmit wireless power to the first electronic device 450. Subsequently, the first electronic device 150 periodically transmits a communication packet to the second electronic device 400, and the communication packet may include information indicating a current communication state of the first electronic device 450.

The first electronic device 450 has a predetermined transmission interval for transmitting a different communication packet according to the type of a wireless charging chip installed in the first electronic device 450. Each time the predetermined transmission interval expires, the first electronic device 450 may periodically transmit the communication packet to the second electronic device 400.

According to various embodiments of the present disclosure, while the second electronic device 400 awaits reception of an initial communication packet to transmit wireless power to the first electronic device 450, and the first electronic device 450 is waiting for a predetermined transmission interval to transmit the initial communication packet to the second electronic device 450, a foreign object may be detected between the first electronic device 450 and the second electronic device 400 through activation of the short-range communication unit 457.

According to various embodiments, the short-range communication unit 457 may be identical or similar in configuration to the communication module 220 illustrated in FIG. 2, and include an NFC unit (the NFC module 228 in FIG. 2). According to an embodiment, the short-range communication unit 457 may include a radio frequency identification (RFID) module.

According to an embodiment, if communication is established between the NFC unit and an NFC unit included in a foreign object through the activation of the NFC unit, the existence of the foreign object between the first electronic device 450 and the second electronic device 400 may be identified.

According to various embodiments, the controller 452 (e.g., the processor 120 of the electronic device 101 or the processor 210 of the electronic device 201) may provide overall control to the electronic device 400. The controller 452 may provide overall control to the operations of the electronic device 400 by means of an algorithm, a program, or an application required to control stored in the memory 456 (e.g., the memory 130 in FIG. 1). The controller 452 may be implemented as a CPU, a microprocessor, or a minicomputer.

According to various embodiments, the controller 452 may identify the existence between a foreign object between the first electronic device 450 and the second electronic device 400 by using the short-range communication unit 457 before wireless charging with the second electronic device 400 that supplies power wirelessly.

According to an embodiment, the controller 452 may transmit a power supply discovery response signal to the second electronic device 400 in response to a power supply discovery signal received from the second electronic device 400, and identify that the first electronic device 450 has been cradled on the second electronic device 400 from a connection between the communication unit 453 of the first electronic device 450 and the communication unit 413 of the second electronic device 400.

According to an embodiment, upon receipt of a signal requesting information about the first electronic device 450 from the second electronic device 400, for a communication connection to the first electronic device 450, the controller 452 may transmit information (e.g., a signal strength, an ID and a charging mode) about the first electronic device 450 to the second electronic device 400.

According to an embodiment, the controller 452 may identify the type of the charging mode of the first electronic device 450 after transmitting the information about the first electronic device 450. If only the first mode is available, in which the first electronic device 450 may perform low-power wireless charging, the controller 452 may wait for charging in the first mode (e.g., the first power charging 5 W). If the first mode and the second mode (e.g., the second power charging 9 W) where the first electronic device 450 may perform mid-power wireless charging are available, the controller 452 may wait for charging in the second mode for mid-power wireless charging switched from the first mode for low-power wireless charging.

According to an embodiment, if the controller 452 identifies that an accessory cover has been mounted on the first electronic device 450 through an accessory cover detector (not shown), the controller 452 may identify whether the accessory cover is opened. If the accessory cover is identified as opened, the controller 452 may identify the type of the charging mode of the first electronic device 450. If only the first mode is available, in which the first electronic device 450 may perform low-power wireless charging, the controller 452 may wait for charging in the first mode (e.g., the first power charging 5 W). If the first mode and the second mode (e.g., the second power charging 9 W) where the first electronic device 450 may perform mid-power wireless charging are available, the controller 452 may wait for charging in the second mode for mid-power wireless charging switched from the first mode for low-power wireless charging.

According to an embodiment, the controller 452 may detect a transmission interval for the communication information based on the type of the wireless charging chip of the first electronic device 450 after transmitting the information about the first electronic device 450. The controller 452 may detect a communication packet transmission interval corresponding to the type of the wireless charging chip installed in the first electronic device 450 and the type of the current charging mode (e.g., the first mode in which low-power wireless charging may be performed (e.g., the first power charging 5 W) or the second mode in which mid-power wireless charging may be performed (e.g., the second power charging 9 W)), referring to the communication packet transmission interval table stored in the memory 456.

According to an embodiment, the controller 452 may activate the short-range communication unit 457 (e.g., the NFC unit) during a communication packet transmission interval for transmitting an initial communication packet to the second electronic device 400. Once a communication connection is established between the NFC unit of the first electronic device 450 and an NFC unit installed in a foreign object, the controller 452 may identify the existence of the foreign object between the first electronic device 450 and the second electronic device 400.

According to an embodiment, if the controller 452 identifies the existence of the foreign object between the first electronic device 450 and the second electronic device 400, the controller 452 may display information indicating that the foreign object has been detected on the display 455, and transmit a signal requesting discontinuation of the charging to the second electronic device 400.

According to an embodiment, when the controller 452 identifies that a foreign object exists between the first electronic device 450 and the second electronic device 400, the controller 452 may transmit a signal requesting charge current drop due to the detection of the foreign object to the second electronic device 400. Upon receipt of a signal indicating charge current drop from the second electronic device 400, the controller 452 may start to transmit a communication packet. According to the charge current drop request, the second electronic device 400 may perform wireless charging for the first electronic device 450, while transmitting to the first electronic device 450 a predetermined low power level that does not generate heat on the foreign object or the surface of the first electronic device 450.

According to an embodiment, if communication is not established with the activated NFC of the first electronic device 450 until expiration of a transmission interval for the initial communication packet, the controller 452 may identify that there is no foreign object between the first electronic device 450 and the second electronic device 400, deactivate the NFC unit of the first electronic device 450, and start to transmit a communication packet to the second electronic device 400.

The second electronic device 400 (e.g., a wireless power transmitter) according to various embodiments of the present disclosure may include a power transmitter 411, a controller 412, the communication unit 413, a sensing unit 415, and a storage 416.

According to various embodiments, the power transmitter 411 may supply power requested by the first electronic device 450 to receive the power, and include the loop coil 411L formed in a conductive pattern. The power transmitter 411 may be configured to transmit wireless power to the first electronic device 450 through the loop coil 411L. The power transmitter 411 may receive power in DC or AC waveforms from the outside, and supply the received power in AC waveforms to the first electronic device 450. For example, when receiving power in DC waveforms from the outside, the power transmitter 411 may convert the DC waveform power to AC waveform power by using an inverter and supply the AC waveform power to the first electronic device 450. As far as it is capable of supplying certain AC waveform power, any means is available as the power transmitter 411, not limited to the foregoing one.

Further, the power transmitter 411 may provide the AC waveform power in the form of electromagnetic waves to the first electronic device 450. The power transmitter 411 may transmit or receive certain electromagnetic waves generated by applying current to the loop coil 411L by electromagnetic induction or resonance.

The power transmitter 411 may further include a first communication unit 413a (e.g., a resonance circuit), and conduct communication (e.g., data communication) in an in-band manner by electromagnetic waves generated from the loop coil 411L. The first communication unit 413a will be described later in greater detail in conjunction with the communication unit 413.

Further, the power transmitter 411 may be configured as a built-in battery, or as a power receiving interface through which external power is received and supplied to other components.

The power transmitter 411 may further include, for example, a power adapter 411a, a power generator 411b, and a matching unit 411c in addition to the loop coil 411L.

The power adapter 411a may receive external AC or DC power or a power signal of the battery device and output the received power as DC power having a predetermined voltage value. The voltage value of the DC power output from the power adapter 411a may be controlled by the controller 412. The DC power output from the power adapter 411a may be output to the power generator 411b.

The power generator 411b may convert DC current received from the power adapter 411a to AC current. The power generator 411b may include a predetermined amplifier (not shown). If the DC current received from the power adapter 411a is less than a predetermined gain, the power generator 411a may amplify the DC current to a predetermined gain by the amplifier. Further, the power generator 411b may further include a circuit for converting DC current received from the power adapter 411a to AC current based on a control signal received from the controller 412. For example, the power generator 411b may convert the DC current to AC current through a predetermined inverter. Further, the power generator 411b may further include a gate driver (not shown), and the gate driver may convert the DC current to AC current by controlling whether the DC current is on/off. Further, the power generator 411b may generate an AC power signal through a wireless power generator (e.g., an oscillator). Therefore, the power generator 411b may output AC power.

The matching unit 411c may perform impedance matching. For example, when an AC signal output from the power generator 411b is provided to the loop coil 411L, an electromagnetic field may be formed in the loop coil 411L by the AC signal. The frequency band of the formed electromagnetic field signal may be adjusted by adjusting impedance of the matching unit 411c. The matching unit 411c may control output power to be transmitted to the first electronic device 450 through the loop coil 411L by the impedance adjustment so that the output power has high efficiency and high output. The matching unit 411c may adjust impedance under the control of the controller 412. The matching unit 411c may include at least one of an inductor (e.g., a coil), a capacitor, or a switch device. The controller 412 may control the state of connection to at least one of the inductor or the capacitor through the switch device, and perform impedance matching accordingly.

The power transmitter 411 is not limited thereto, and it will be easily understood to those skilled in the art that any means capable of transmitting and receiving electromagnetic waves is available as the power transmitter 411.

According to various embodiments, the sensing unit 415 (e.g., the sensor module 240 in FIG. 2) may sense a change in current/voltage applied to the loop coil 411L of the power transmitter 411. The second electronic device 400 may generate as much power as the magnitude of the current/voltage applied to the loop coil 411L, for transmission to the first electronic device 450. That is, the second electronic device 400 may change the amount of power to be transmitted according to the change of current/voltage applied to the loop coil 411L. For example, as the magnitude of current/voltage applied to the loop coil 411L increases, the amount of power to be transmitted may increase, and as the magnitude of current/voltage applied to the loop coil 411L decreases, the amount of power to be transmitted may decrease.

According to various embodiments, the communication unit 413 (the first communication unit 413a and the second communication unit 413b) (e.g., the communication interface 170 and the communication module 220) may conduct communication with the first electronic device 450 in a predetermined scheme. The communication unit 413 may conduct data communication with the communication circuit 453 of the first electronic device 450.

For example, the communication unit 413 may receive a signal for information about the first electronic device 450 (e.g., at least one of charging setting information, power amount control information, environment information, or time information). Further, the communication unit 413 may transmit a signal for information about the second electronic device 400 to the external electronic device 450. The communication unit 413 may unicast, multicast, or broadcast the signal. Further, the communication unit 413 may transmit a charging function control signal for controlling the charging function of the first electronic device 450. The charging function control signal may be a control signal that enables or disables the charging function by controlling the power receiver 451 of a specific first electronic device (e.g., the first electronic device 450).

The communication unit 413 may receive a signal from or transmit a signal to another wireless power transmission apparatus (not shown) as well as the first electronic device 450.

The communication unit 413 and, for example, the power transmitter 411 may be incorporated into one hardware component, and thus may include at least one of the first communication unit 413*a* for enabling the second electronic device 400 to communicate in an in-band manner, or the second communication unit 413*b* for enabling the second electronic device 400 in an out-of-band manner.

For example, if the communication unit 413 includes the first communication unit 413*a* capable of in-band communication, the first communication unit 413*a* may receive the frequency and signal level of an electromagnetic field signal received through the loop coil 411L of the power transmitter 411. The controller 412 may extract information received from the first electronic device 450 by decoding the frequency and signal level of the received electromagnetic field signal. Further, the first communication unit 413*a* may transmit a signal for information about the second electronic device 400 to the first electronic device 450 by applying the signal to the loop coil 411L of the power transmitter 411 or adding the signal to an electromagnetic field signal generated by applying a signal output from the matching unit 411*c* to the loop coil 411L. The controller 412 may control a change in the state of connection to at least one of the inductor or the capacitor of the matching unit 411*c* by controlling whether the switching device of the matching unit 411*c* is on/off for the signal output.

For example, if the communication unit 413 includes the second communication unit 413*b* capable of out-of-band communication, the second communication unit 413*b* may communicate with the communication unit 453 (e.g., the second communication unit 453*b*) of the first electronic device 450 by NFC communication, Zigbee communication, infrared communication, visible ray communication, Bluetooth communication, Bluetooth low energy (BLE) communication, or the like.

The foregoing communication schemes of the communication unit 413 are merely exemplary, and the scope of the embodiments of the present disclosure is not limited by a specific communication scheme performed in the communication unit 413.

The second electronic device 400 and the first electronic device 450 may transmit and receive signals through their respective communication units 413 and 453.

According to various embodiments, the controller 412 (e.g., the processor 120 of the electronic device 101 or the processor 210 of the electronic device 201) may provide overall control to the electronic device 400. The controller 412 may provide overall control to the operations of the electronic device 400 by means of an algorithm, a program, or an application required to control, stored in the memory 416 (e.g., the memory 130). The controller 412 may be implemented as a CPU, a microprocessor, or a minicomputer.

The controller 412 may control wireless power transmission to the first electronic device 450 through the power transmitter 411. The controller 412 may control wireless information reception from the first electronic device 450 through the communication unit 413.

According to an embodiment, the controller 412 may receive a power supply discovery response signal from the first electronic device 450 during periodic transmission of a power supply discovery signal (e.g., analog ping), and identify that the first electronic device is cradled on the second electronic device from a connection between the communication unit 453 of the first electronic device 450 and the communication unit 413 of the second electronic device 400.

According to an embodiment, the controller 412 requests information about a first electronic device to the first electronic device 450, for a communication connection to the first electronic device 450, and upon receipt of information (e.g., a signal strength, an ID, and a charging mode) about the first electronic device 450, the controller 412 enters a power supply mode. After entering the power supply mode, the controller 412 awaits reception of communication information (e.g., a communication packet) from the first electronic device 450.

According to an embodiment, upon receipt of a signal requesting discontinuation of the charging while awaiting reception of communication information (e.g., a communication packet) from the first electronic device 450, the controller 412 discontinues the charging with the first electronic device 450.

According to an embodiment, upon receipt of a signal requesting charge current drop due to detection of a foreign object from the first electronic device 450 while awaiting reception of communication information (e.g., a communication packet) from the first electronic device 450, the controller 412 may drop the charge current by a predetermined level and transmit a signal that the charge current has been dropped to the first electronic device 450.

Upon receipt of communication information (e.g., a communication packet) from the first electronic device 450 after transmitting the signal indicating that the charge current has been dropped, the controller 412 may perform wireless charging between the first electronic device 450 and the second electronic device 400 by transmitting a low power level that does not generate heat on the foreign object or the surface of the first electronic device 450.

According to an embodiment, upon receipt of communication information (e.g., a communication packet) from the first electronic device 450 while awaiting reception of the communication information (e.g., communication packet) from the first electronic device 450, the controller 412 may perform wireless charging between the first electronic device 450 and the second electronic device 400 by transmitting wireless power corresponding to a fast charging mode or a normal charging mode to the first electronic device 450.

While the first electronic device 450 and the second electronic device 400 according to various embodiments of the present disclosure are shown in FIG. 4 as including only the power receiver 451 and the power transmitter 411, respectively, each of the first electronic device 450 and the second electronic device 400 may include both of the power receiver 415 and the power transmitter 411. Accordingly, the first electronic device 450 and the second electronic device 400 according to various embodiments of the present disclosure may execute the functions of both of a power transmitter and a power receiver.

According to various embodiments, an electronic device may include the short-range communication unit 457, and the controller 452 electrically coupled to the short-range communication unit 457. The controller 452 may be configured to identify whether a foreign object is located between the electronic device (450) and a second electronic device (400) supplying wireless power by means of the short-range communication unit 457 before performing wireless charging with the second electronic device (400).

According to various embodiments, the controller 452 may be configured to activate the short-range communication unit, before transmitting communication information of the electronic device corresponding to wireless charging initiation to the second electronic device (400), and detect the foreign object through a connection between the activated short-range communication unit and a short-range communication unit included in the foreign object.

According to various embodiments, the controller 452 may be configured to detect a transmission interval for the communication information based on a type of a wireless charging chip of the electronic device, and detect the foreign object by activating the short-range communication unit during the transmission interval of the communication information.

According to various embodiments, if the foreign object is not detected until expiration of the transmission interval of the communication information, the controller 452 may be configured to transmit the communication information to the second electronic device (400) and perform wireless charging with the second electronic device (400).

According to various embodiments, the communication information of the electronic device may represent a communication packet.

According to various embodiments, the electronic device may further include a memory configured to store transmission intervals for communication information of the electronic device according to types of wireless charging chips.

According to various embodiments, if the controller 452 identifies that an accessory cover mounted on the electronic device is opened before wireless charging is performed with the second electronic device (400), the controller 452 may be configured to identify whether the foreign object is located between the electronic device and the second electronic device (400) by means of the short-range communication unit.

According to various embodiments, if the electronic device includes a first mode for performing low-power wireless charging and a second mode for performing mid-power wireless charging, the controller 452 may be configured to identify whether the foreign object is located between the electronic device and the second electronic device (400) by means of the short-range communication unit, while awaiting charging in the second mode, before wireless charging is performed with the second electronic device (400).

According to various embodiments, the controller 452 may be configured to, upon detection of the foreign object, display information indicating the detection of the foreign object and transmit a signal requesting discontinuation of the charging to the second electronic device (400).

According to various embodiments, the controller 452 may be configured to, upon detection of the foreign object, transmit a signal requesting charge current drop to the second electronic device (400).

Figure 6:
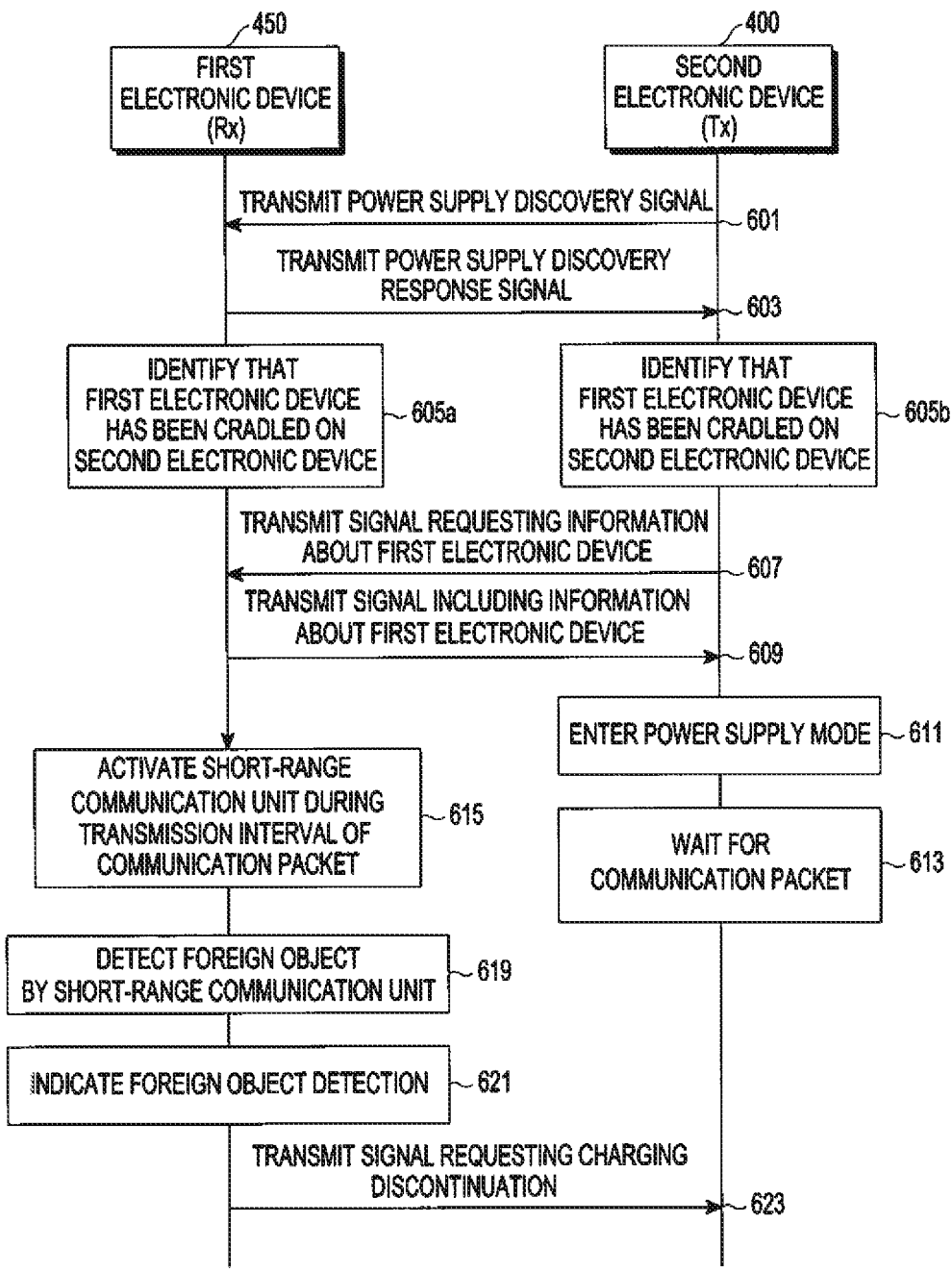
FIG. 6 is a diagram illustrating a signal flow for an operation for detecting a foreign object in a wireless charging system according to an embodiment of the present disclosure.

FIG. 6 is a flowchart illustrating an operation for detecting a foreign object in a wireless charging system according to an embodiment of the present disclosure. In FIG. 6, the operation for detecting a foreign object in a wireless charging system according to the embodiment of the present disclosure may be described as performed by the first electronic device 450 and the second electronic device 400 of FIG. 4, by way of example.

Referring to FIG. 6, the second electronic device 400 may periodically transmit a power supply discovery signal (e.g., analog ping) in operation 601.

In operation 603, upon receipt of the power supply discovery signal from the second electronic device 400, the first electronic device 450 may transmit a power supply discovery response signal to the second electronic device 400.

Each of the first and second electronic devices 450 and 400 may identify that the first electronic device 450 has been cradled on the second electronic device 400 by communication between the communication unit 453 of the first electronic device 450 and the communication unit 413 of the second electronic device 400 in operations 605a and 605b.

In operation 607, the second electronic device 400 may request information about the first electronic device 450 to the first electronic device 450, to prepare for communication with the first electronic device 450.

In operation 609, the first electronic device 450 may transmit, to the second electronic device 400, a signal including information (e.g., a signal strength, an ID, and a charging mode) about the first electronic device 450 according to the request of information about the first electronic device from the second electronic device 400.

In operation 611, upon receipt of the information about the first electronic device, the second electronic device 400 may enter a power supply mode.

In operation 613, the second electronic device 400 may await reception of communication information (e.g., a communication packet) of the first electronic device 450 from the first electronic device 450 in the power supply mode.

In operation 615, after transmitting the information about the first electronic device 450 to the second electronic device 400, the first electronic device 450 may detect, from the memory 456, a transmission interval for the communication information (e.g., communication packet) of the first electronic device 450 according to the type of a wireless charging chip (e.g., the power receiver 451 and the first communication unit 453a) installed for wireless charging in the first electronic device 450. The first electronic device 450 may activate the short-range communication unit 457 (e.g., the NFC unit) during the detected transmission interval for the communication information (e.g., communication packet) of the first electronic device 450.

In operation 619, when communication is established between the activated short-range communication unit 457 (e.g., the NFC unit) and a short-range communication unit (e.g., an NFC unit) of a foreign object (e.g., a credit card that can be used as a traffic card using NFC), the first electronic device 450 may identify that there is the foreign object between the first electronic device 450 and the second electronic device 400 by using the connection of the short-range communication unit (e.g., the NFC unit).

In operation 621, the first electronic device 450 may display information indicating the existence of the foreign object between the first electronic device 450 and the second electronic device 400 on the display 455.

In operation 623, the first electronic device 450 may transmit a signal requesting discontinuation of the charging to the second electronic device 400.

Figure 7:
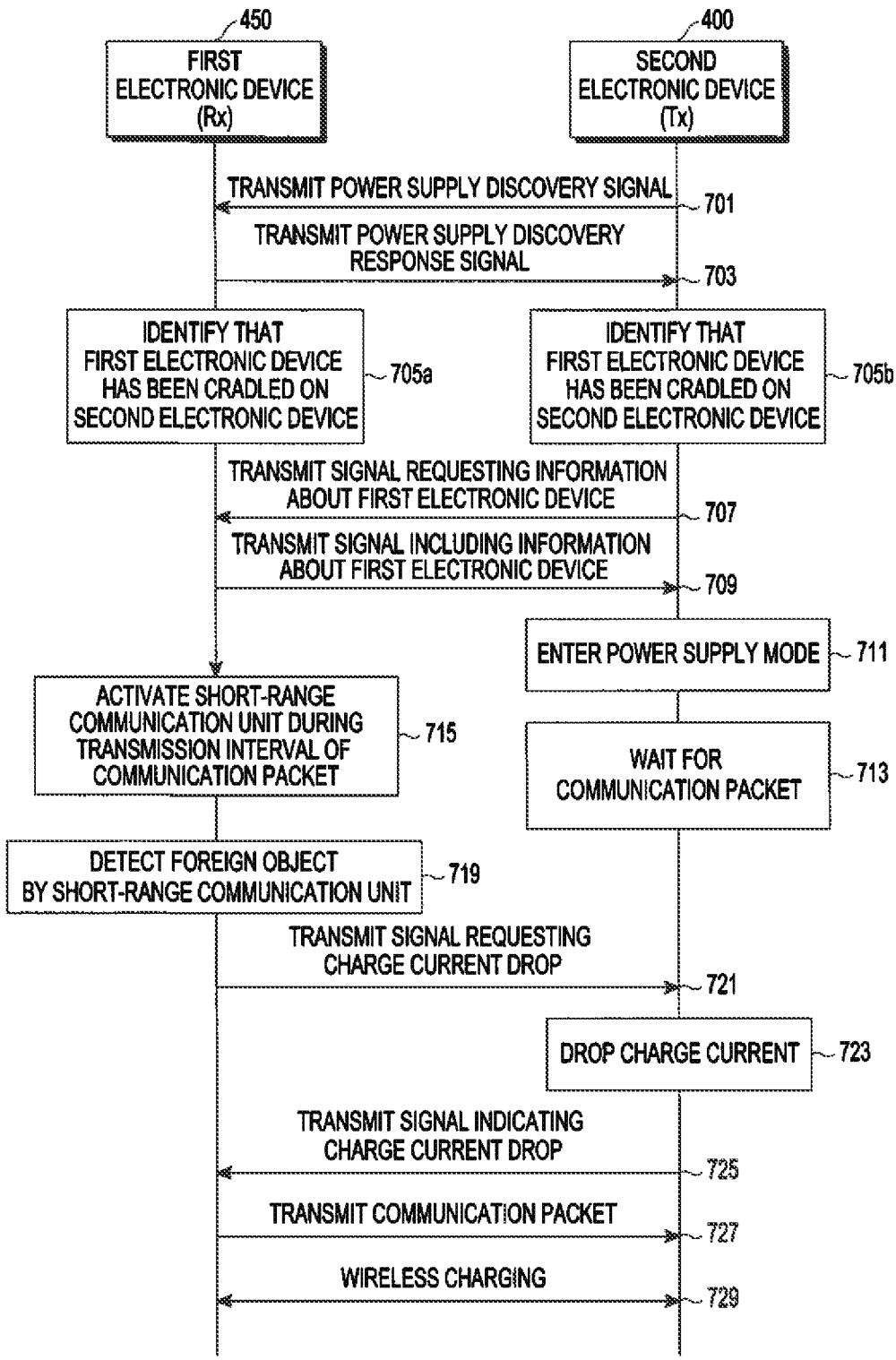
FIG. 7 is a diagram illustrating a signal flow for an operation for detecting a foreign object in a wireless charging system according to another embodiment of the present disclosure.

FIG. 7 is a flowchart illustrating an operation for detecting a foreign object in a wireless charging system according to another embodiment of the present disclosure. In FIG. 7, the operation for detecting a foreign object in a wireless charging system according to the second embodiment of the present disclosure will be described as performed by the first electronic device 450 and the second electronic device 400 of FIG. 4, by way of example.

Referring to FIG. 7, the second electronic device 400 may periodically transmit a power supply discovery signal (e.g., Analog Ping) in operation 701.

In operation 703, upon receipt of the power supply discovery signal from the second electronic device 400, the first electronic device 450 may transmit a power supply discovery response signal to the second electronic device 400.

Each of the first and second electronic devices 450 and 400 may identify that the first electronic device 450 has been cradled on the second electronic device 400 by communication between the communication unit 453 of the first electronic device 450 and the communication unit 413 of the second electronic device 400 in operations 705*a* and 705*b*.

In operation 707, the second electronic device 400 may request information about the first electronic device 450 to the first electronic device 450, to prepare for communication with the first electronic device 450.

In operation 709, the first electronic device 450 may transmit, to the second electronic device 400, a signal including information (e.g., a signal strength, an ID, and a charging mode) about the first electronic device 450 according to the request of information about the first electronic device from the second electronic device 400.

In operation 711, upon receipt of the information about the first electronic device 450, the second electronic device 400 may enter a power supply mode.

In operation 713, the second electronic device 400 may await reception of communication information (e.g., a communication packet) of the first electronic device 450 from the first electronic device 450 in the power supply mode.

In operation 715, after transmitting the information about the first electronic device 450 to the second electronic device 400, the first electronic device 450 may detect, from the memory 456, a transmission interval for the communication information (e.g., communication packet) of the first electronic device 450 according to the type of a wireless charging chip (e.g., the power receiver 451 and the first communication unit 453*a*) installed for wireless charging in the first electronic device 450. The first electronic device 450 may activate the short-range communication unit 457 (e.g., the NFC unit) during the detected transmission interval for the communication information (e.g., communication packet) of the first electronic device 450.

In operation 719, when communication is established between the activated short-range communication unit 457 (e.g., the NFC unit) and a short-range communication unit (e.g., an MFC unit) of a foreign object (e.g., a credit card that can be used as a traffic card using NFC), the first electronic device 450 may identify that there is the foreign object between the first electronic device 450 and the second electronic device 400 by using the connection of the short-range communication unit (e.g., the NFC unit).

In operation 721, the first electronic device 450 may transmit a signal requesting charging power drop due to the detection of the foreign object to the second electronic device 400.

In operation 723, the second electronic device 400 may drop charging power to a predetermined power level that does not generate heat on the foreign object or the surface of the first electronic device 450 according to the request of charging power drop due to the detection of the foreign object.

In operation 725, the second electronic device 400 may transmit a signal that the charging power has been dropped to the first electronic device 450.

In operation 727, the first electronic device 450 may transmit, to the second electronic device 400, communication information (e.g., a communication packet) of the first electronic device 450, indicating the current communication state of the first electronic device 450. In operation 729, the first electronic device 450 may perform wireless charging with the second electronic device 400, with the charging power dropped to the predetermined power level. Each time the transmission interval of the communication information (e.g., communication packet) of the first electronic device 450 expires during the wireless charging, the first electronic device 450 may periodically transmit communication information of the first electronic device 450 to the second electronic device 400.

Figure 8:
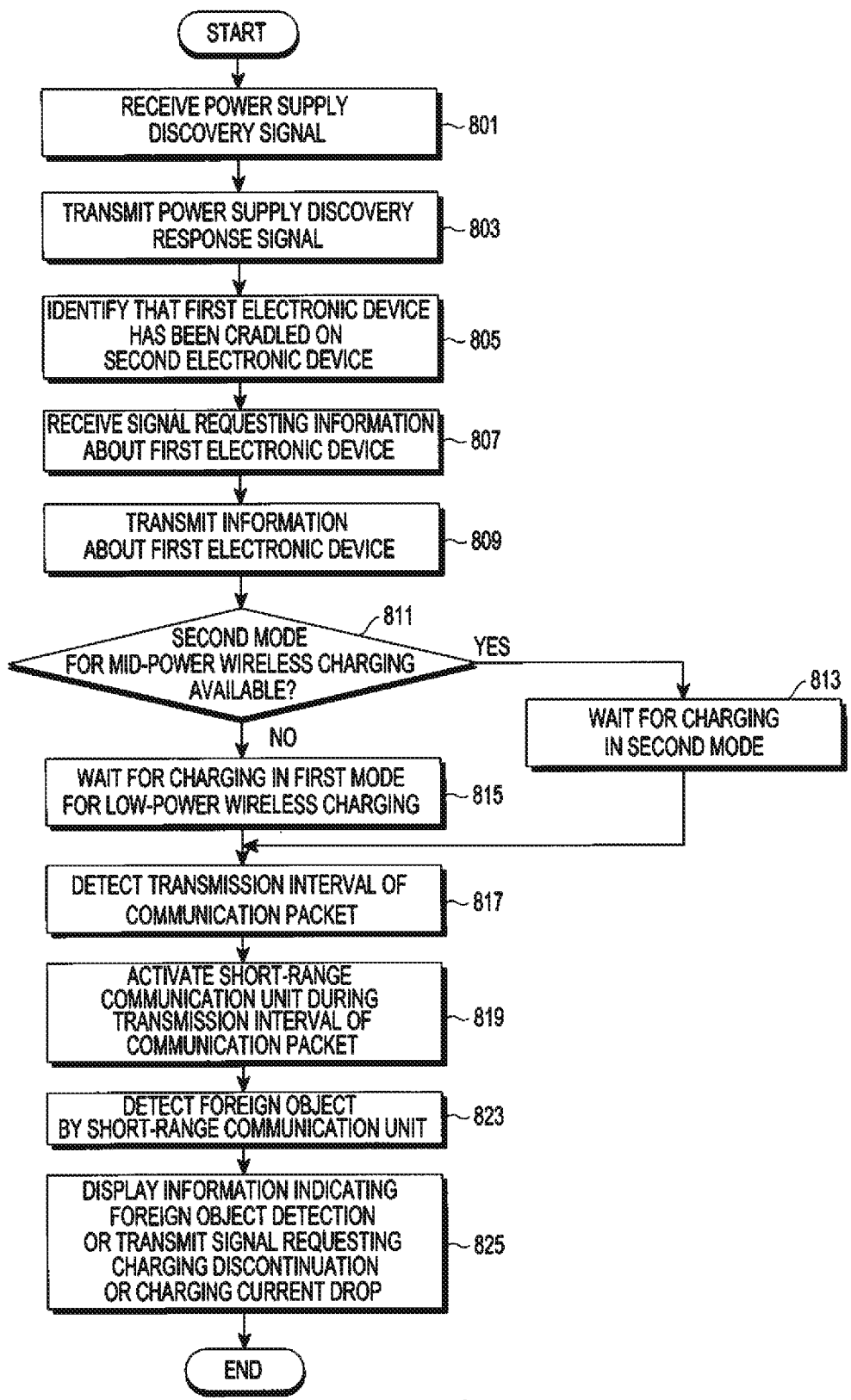
FIG. 8 is a flowchart illustrating an operation for detecting a foreign object in an electronic device according to an embodiment of the present disclosure.

FIG. 8 is a flowchart illustrating an operation for detecting a foreign object in an electronic device according to an embodiment of the present disclosure. In FIG. 8, the operation for detecting a foreign object in an electronic device according to the embodiment of the present disclosure will be described as performed by the controller 452 of the first electronic device 450 illustrated in FIG. 4, by way of example.

Referring to FIG. 8, the controller 452 may receive a power supply discovery signal (e.g., analog ping) from the second electronic device 400 that supplies wireless power in operation 801.

In operation 803, the controller 452 may transmit a power supply discovery response signal to the second electronic device 400 in response to the power supply discovery signal.

In operation 805, the controller 452 may identify that the first electronic device 450 has been cradled on the second electronic device 400 by communication between the communication unit of the first electronic device 450 and the communication unit of the second electronic device 400.

In operation 807, the controller 452 may receive a request for information about the first electronic device from the second electronic device to prepare for communication with the first electronic device 450.

In operation 809, the controller 452 may transmit, to the second electronic device, a signal including information (e.g., a signal strength, an ID, and a charging mode) about the first electronic device according to the request for information about the first electronic device.

In operation 811, the controller 452 determines whether the second mode (e.g., the second power charging 9 W) where the first electronic device may perform mid-power wireless charging is available. If the second mode is available, the controller 452 may await charging in the second mode for mid-power wireless charging switched from the first mode for low-power wireless charging in operation 813. If the controller 452 determines that the second mode is not available to the first electronic device in operation 811, the controller 452 may await charging in the first mode (e.g., the first power charging 5 W) where low-power wireless charging may be performed in operation 815.

In operation 817, the controller 452 may detect, from the memory, a transmission interval for communication information (e.g., communication packet) of the first electronic device according to the type of a wireless charging chip (e.g., the power receiver 451 and the first communication unit 453*a*) installed for wireless charging in the first electronic device.

In operation 819, the controller 452 may activate the short-range communication unit (e.g., the NFC unit) during the detected transmission interval of the communication information (e.g., communication packet) of the first electronic device.

In operation 823, when communication is established between the activated short-range communication unit (e.g., the NFC unit) and a short-range communication unit (e.g., an NFC unit) of a foreign object (e.g., a credit card that can be used as a traffic card using NFC), the controller 452 may identify that there is the foreign object between the first electronic device 450 and the second electronic device 400 by using the connection of the short-range communication unit (e.g., the NFC unit).

In operation 825, the controller 452 may display information indicating the existence of the foreign object between the first electronic device 450 and the second electronic device 400 on the display 455, transmit a signal requesting discontinuation of the charging to the second electronic device, or transmit a signal requesting charging power drop to the second electronic device.

For example, with the protection case surrounding the rear surface of the electronic device, if a foreign object, for example, a credit card having a traffic card function is inserted in the protection case and the first electronic device equipped with the protection case is cradled on the second electronic device that supplies wireless power, the credit card inserted in the protection case is positioned between the first electronic device and the second electronic device. According to various embodiments of the present disclosure, if a communication connection is established between the short-range communication unit (e.g., the NFC unit) of the first electronic device and a short-range communication unit (e.g., an NFC unit) inserted for the traffic card function of the credit card before wireless charging starts between the first and second electronic devices, the first electronic device may identify the existence of the foreign object (e.g., the credit card), display information indicating the detection of the foreign object, and request discontinuation of the charging or charging power drop to the second electronic device.

Figure 9:
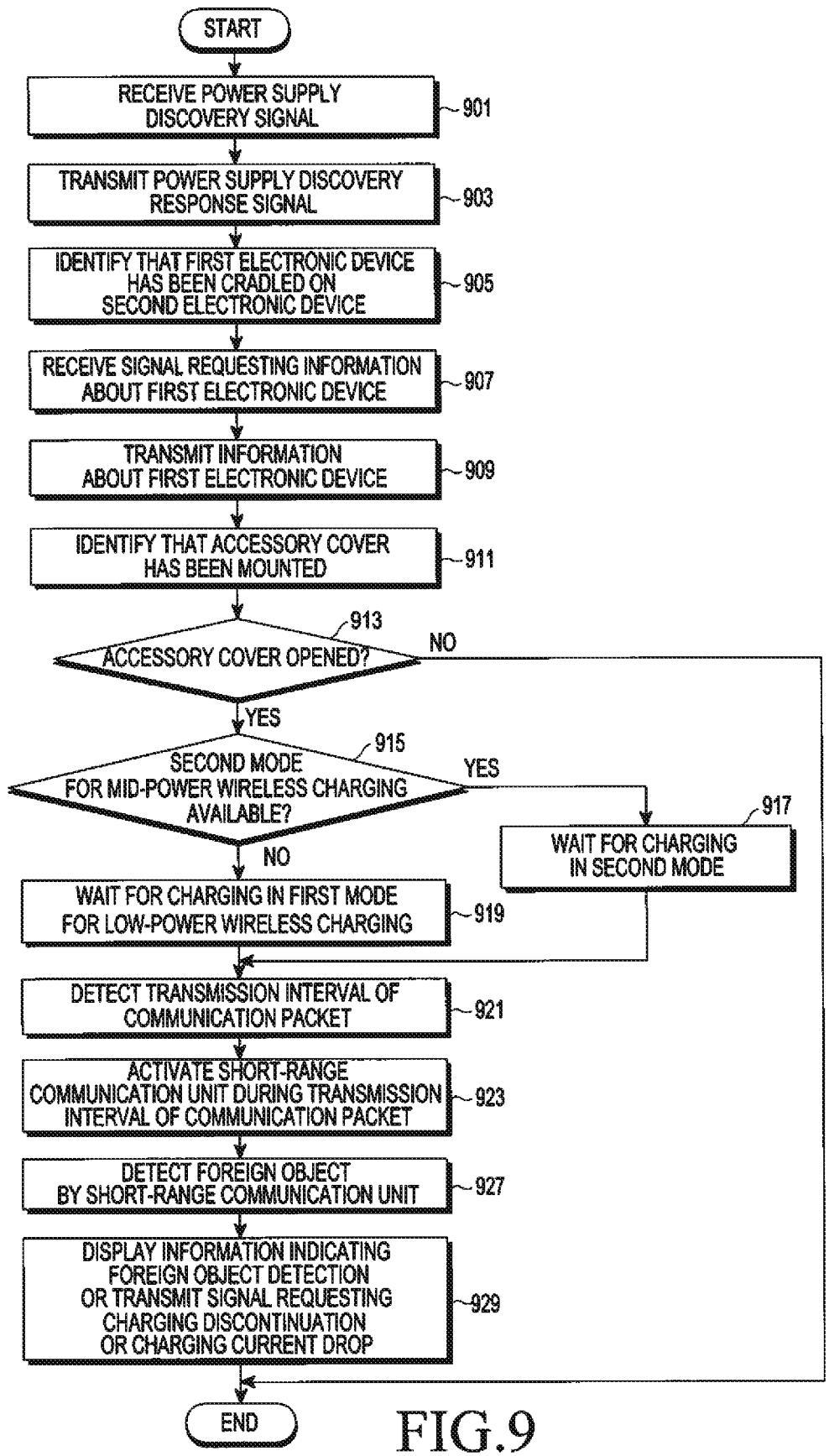
FIG. 9 is a flowchart illustrating an operation for detecting a foreign object in an electronic device according to another embodiment of the present disclosure.

FIG. 9 is a flowchart illustrating an operation for detecting a foreign object in an electronic device according to another embodiment of the present disclosure. In FIG. 9, the operation for detecting a foreign object in an electronic device according to the second embodiment of the present disclosure will be described as performed by the controller 452 of the first electronic device 450 illustrated in FIG. 4, by way of example.

Referring to FIG. 9, the controller 452 may receive a power supply discovery signal (e.g., analog ping) from the second electronic device that supplies wireless power in operation 901.

In operation 903, the controller 452 may transmit a power supply discovery response signal to the second electronic device 400 in response to the power supply discovery signal.

In operation 905, the controller 452 may identify that the first electronic device has been cradled on the second electronic device by communication between the communication unit of the first electronic device and the communication unit of the second electronic device.

In operation 907, the controller 452 may receive a request for information about the first electronic device from the second electronic device to prepare for communication with the first electronic device.

In operation 909, the controller 452 may transmit, to the second electronic device, a signal including information (e.g., a signal strength, an ID, and a charging mode) about the first electronic device according to the request for information.

In operation 911, the controller 452 may identify whether an accessory cover has been mounted on the first electronic device through an accessory cover detector (not shown). If identifying that the accessory cover has not been mounted on the first electronic device, the controller 452 may perform operations 811 to 829 of FIG. 8.

In operation 913, if the accessory cover is identified as opened, the controller 452 may determine whether the second mode (e.g., the second power charging 9 W) where the first electronic device may perform mid-power wireless charging is available. If the second mode is available in operation 915, the controller 452 may await charging in the second mode for mid-power wireless charging switched from the first mode for low-power wireless charging in operation 917.

If the controller 452 determines that the second mode is not available to the first electronic device in operation 915, the controller 452 may await charging in the first mode (e.g., the first power charging 5 W) in which low-power wireless charging may be performed in operation 919.

In operation 921, the controller 452 may detect, from the memory, a transmission interval for communication information (e.g., a communication packet) of the first electronic device according to the type of a wireless charging chip (e.g., the power receiver 451 and the first communication unit 453a) installed for wireless charging in the first electronic device.

In operation 923, the controller 452 may activate the short-range communication unit (e.g., the NFC unit) during the detected transmission interval of the communication information (e.g., communication packet) of the first electronic device.

In operation 927, when communication is established between the activated short-range communication unit (e.g., the NFC unit) and a short-range communication unit (e.g., an MFC unit) of a foreign object (e.g., a credit card that can be used as a traffic card using NFC), the controller 452 may identify that there is the foreign object between the first electronic device 450 and the second electronic device 400 by using the connection of the short-range communication unit (e.g., the NFC unit).

In operation 929, the controller 452 may display information indicating the existence of the foreign object between the first electronic device 450 and the second electronic device 400 on the display, transmit a signal requesting discontinuation of the charging to the second electronic device, or transmit a signal requesting charging power drop to the second electronic device.

For example, an accessory cover may be configured to cover the front and rear surfaces of the electronic device, and opened or closed so that the display on the front surface of the electronic device may or may not be viewed. A foreign object, for example, a credit card with a traffic card function may be inserted in the accessory cover. If the first electronic device is cradled on the second electronic device, with the cover opened and rotated at 360 degrees to the rear surface of the electronic device, the credit card inserted in the cover is positioned between the first electronic device and the second electronic device. According to various embodiments of the present disclosure, if a communication connection is established between the short-range communication unit (e.g., the NFC unit) of the first electronic device and a short-range communication unit (e.g., an NFC unit) inserted for the traffic card function of the credit card before wireless charging starts between the first and second electronic devices, the first electronic device may identify the existence of the foreign object (e.g., the credit card), display information indicating the detection of the foreign object, and request discontinuation of the charging or charging power drop to the second electronic device.

According to various embodiments, a method of detecting a foreign object in an electronic device may include activating a short-range communication unit before wireless charging is performed with a first electronic device supplying wireless power, and identifying whether a foreign object is located between the electronic device (450) and the second electronic device (400) by means of the short-range communication unit.

According to various embodiments, the activation may include detecting a transmission interval for communication information corresponding to wireless charging initiation based on a type of a wireless charging chip of the electronic device before transmitting the communication information of the electronic device (450) to the second electronic device (400) and detecting the foreign object by activating the short-range communication unit during the transmission interval of the communication information.

According to various embodiments, the detection of the foreign object may include detecting the foreign object by a connection between the activated short-range communication unit and a short-range communication unit included in the foreign object.

According to various embodiments, if the foreign object is not detected until expiration of the transmission interval of the communication information, the method may further include transmitting the communication information to the second electronic device (400) and performing wireless charging with the second electronic device (400).

According to various embodiments, the communication information of the electronic device may represent a communication packet.

According to various embodiments, the detection of a transmission interval for communication information may include detecting the transmission interval of the communication information based on the type of the wireless charging chip of the electronic device from a memory storing transmission intervals for communication information of the electronic device according to types of wireless charging chips.

According to various embodiments, the method may further include, if it is identified that an accessory cover mounted on the electronic device (450) is opened before wireless charging is performed with the second electronic device (400), identifying whether the foreign object is located between the electronic device and the second electronic device (400) by means of the short-range communication unit.

According to various embodiments, the method may further include, if the electronic device includes a first mode performing low-power wireless charging and a second mode for performing mid-power wireless charging, identifying whether the foreign object is located between the electronic device (450) and the second electronic device (400) by means of the short-range communication unit, while awaiting charging in the second mode, before wireless charging is performed with the second electronic device (400).

According to various embodiments, the method may further include, upon detection of the foreign object, displaying information indicating the detection of the foreign object and transmitting a signal requesting discontinuation of the charging to the second electronic device (400).

According to various embodiments, the method may further include, upon detection of the foreign object, transmitting a signal requesting charge current drop to the second electronic device (400).

According to various embodiments, a storage medium storing instructions, the instructions may be configured to, when executed by at least one processor, cause the process to perform at least one operation. The at least one operation may include recording a program which performs activating a short-range communication unit before wireless charging with the second electronic device (400) supplying wireless power is performed, and identifying whether a foreign object is located between an electronic device (450) and the second electronic device (400) by means of the short-range communication unit.

The invention claimed is:

1. An electronic device comprising:
a short-range communication unit; and
a controller electrically coupled to the short-range communication unit,
wherein the controller is configured to:
identify whether a foreign object is located between the electronic device and a first electronic device supplying wireless power by means of the short-range communication unit, before performing wireless charging with the first electronic device, and
upon detection of the foreign object, display information indicating the detection of the foreign object and transmit a signal requesting discontinuation of the charging to the first electronic device.

2. The electronic device of claim 1, wherein the controller is configured to:
activate the short-range communication unit, before transmitting communication information of the electronic device corresponding to wireless charging initiation to the first electronic device, and
detect the foreign object through a connection between the activated short-range communication unit and a short-range communication unit included in the foreign object.

3. The electronic device of claim 2, wherein the controller is configured to:
detect a transmission interval for the communication information based on a type of a wireless charging chip of the electronic device,
detect the foreign object by activating the short-range communication unit during the transmission interval of the communication information,
transmit the communication information to the first electronic device, when the foreign object is not detected until expiration of the transmission interval of the communication information, and
perform wireless charging with the first electronic device, and
wherein the communication information of the electronic device is a communication packet.

4. The electronic device of claim 1, further comprising a memory configured to store transmission intervals for communication information of the electronic device according to types of wireless charging chips.

5. The electronic device of claim 1, wherein when the controller identifies that an accessory cover mounted on the electronic device is opened before wireless charging is performed with the first electronic device, the controller is configured to identify whether the foreign object is located between the electronic device and the first electronic device by means of the short-range communication unit.

6. The electronic device of claim 1, wherein the electronic device includes a first mode for performing low-power wireless charging and a second mode for performing mid-power wireless charging, and
wherein the controller is configured to identify whether the foreign object is located between the electronic device and the first electronic device by means of the short-range communication unit, while awaiting charging in the second mode, before wireless charging is performed with the first electronic device.

7. The electronic device of claim 1, wherein the controller is configured to, upon detection of the foreign object, transmit a signal requesting charge current drop to the first electronic device.

8. A method of detecting a foreign object in an electronic device, the method comprising:
activating a short-range communication unit before wireless charging is performed with a first electronic device supplying wireless power;
identifying whether a foreign object is located between the electronic device and the first electronic device by means of the short-range communication unit; and
upon detection of the foreign object, displaying information indicating the detection of the foreign object and transmitting a signal requesting discontinuation of the charging or a signal requesting charge current drop to the first electronic device.

9. The method of claim 8, wherein activating the short-range communication unit comprises:
detecting a transmission interval for communication information corresponding to wireless charging initiation based on a type of a wireless charging chip of the electronic device, before transmitting the communication information of the electronic device is transmitted to the first electronic device; and
detecting the foreign object by activating the short-range communication unit during the transmission interval of the communication information.

10. The method of claim 9, wherein detecting the foreign object comprises:
detecting the foreign object by a connection between the activated short-range communication unit and a short-range communication unit included in the foreign object;
transmitting the communication information to the first electronic device, when the foreign object is not detected until expiration of the transmission interval of the communication information; and
performing wireless charging with the first electronic device, and
wherein the communication information of the electronic device is a communication packet.

11. The method of claim 9, wherein detecting the transmission interval for communication information comprises:
detecting the transmission interval of the communication information based on the type of the wireless charging chip of the electronic device from a memory storing transmission intervals for communication information of the electronic device according to types of wireless charging chips.

12. The method of claim 8, further comprising:
when opening of an accessory cover mounted on the electronic device is identified before wireless charging is performed with the first electronic device,
identifying whether the foreign object is located between the electronic device and the first electronic device by means of the short-range communication unit.

13. The method of claim 8, further comprising:
when the electronic device includes a first mode for performing low-power wireless charging and a second mode for performing mid-power wireless charging, identifying whether the foreign object is located between the electronic device and the first electronic device by means of the short-range communication unit, while awaiting charging in the second mode, before wireless charging is performed with the first electronic device.

* * * * *